United States Patent
Sasanka et al.

(10) Patent No.: US 9,811,464 B2
(45) Date of Patent: Nov. 7, 2017

(54) APPARATUS AND METHOD FOR CONSIDERING SPATIAL LOCALITY IN LOADING DATA ELEMENTS FOR EXECUTION

(71) Applicant: Intel Corporation, Santa Clara, CA (US)

(72) Inventors: Ruchira Sasanka, Hillsboro, OR (US); Elmoustapha Ould-Ahmed-Vall, Chandler, AZ (US)

(73) Assignee: INTEL CORPORATION, Santa Clara, CA (US)

( * ) Notice: Subject to any disclaimer, the term of this patent is extended or adjusted under 35 U.S.C. 154(b) by 102 days.

(21) Appl. No.: 14/567,602

(22) Filed: Dec. 11, 2014

(65) Prior Publication Data
US 2016/0170883 A1    Jun. 16, 2016

(51) Int. Cl.
*G06F 12/08*     (2016.01)
*G06F 12/0811*   (2016.01)
*G06F 12/0875*   (2016.01)
*G06F 12/0804*   (2016.01)
*G06F 12/0886*   (2016.01)

(52) U.S. Cl.
CPC ...... *G06F 12/0811* (2013.01); *G06F 12/0804* (2013.01); *G06F 12/0875* (2013.01); *G06F 12/0886* (2013.01); *G06F 2212/283* (2013.01); *G06F 2212/452* (2013.01)

(58) Field of Classification Search
CPC ......... G06F 12/0862; G06F 2212/6024; G06F 2212/654; G06F 12/0811; G06F 2212/283
USPC ................ 711/E12.057, 137, 122, 118, 138, 711/E12.024
See application file for complete search history.

(56) References Cited

U.S. PATENT DOCUMENTS

| | | | | |
|---|---|---|---|---|
| 7,441,110 | B1 * | 10/2008 | Puzak | G06F 8/4442 712/207 |
| 9,311,247 | B1 * | 4/2016 | Schuttenberg | G06F 12/0862 |
| 2003/0105942 | A1 | 6/2003 | Damron et al. | |
| 2004/0117557 | A1 * | 6/2004 | Paulraj | G06F 9/345 711/137 |

(Continued)

FOREIGN PATENT DOCUMENTS

WO    2007/113757 A2    10/2007

OTHER PUBLICATIONS

International Search Report and the Written Opinion for Application No. PCT/US2015/054963, dated Feb. 1, 2016, 10 pages.

(Continued)

*Primary Examiner* — Tuan Thai
*Assistant Examiner* — Edward Waddy, Jr.
(74) *Attorney, Agent, or Firm* — Nicholson De Vos Webster & Elliott LLP

(57) ABSTRACT

In one embodiment of the invention, a processor comprising an upper level cache and at least one processor core. The at least one processor core includes one or more registers and a plurality of instruction processing stages: a decode unit to decode an instruction requiring an input of a plurality of data elements, wherein a size of each of the plurality of data elements is less than a cache line size of the processor; an execution unit to load the plurality of data elements to the one or more registers of the processor, without loading data elements spatially adjacent to the plurality of data elements or the plurality of data elements in an upper level cache.

14 Claims, 18 Drawing Sheets

(56) References Cited

U.S. PATENT DOCUMENTS

| | | | |
|---|---|---|---|
| 2005/0071571 A1* | 3/2005 | Luick | G06F 12/0862 |
| | | | 711/137 |
| 2006/0085604 A1 | 4/2006 | Guthrie et al. | |
| 2008/0040546 A1* | 2/2008 | Vasekin | G06F 12/0884 |
| | | | 711/128 |
| 2009/0216956 A1* | 8/2009 | Ekanadham | G06F 12/0862 |
| | | | 711/137 |
| 2011/0022824 A1* | 1/2011 | Goel | G06F 9/3017 |
| | | | 712/211 |
| 2011/0307663 A1 | 12/2011 | Kultursay et al. | |
| 2012/0254592 A1 | 10/2012 | San Adrian et al. | |
| 2013/0232304 A1* | 9/2013 | Lohman | G06F 12/0607 |
| | | | 711/127 |
| 2014/0229682 A1 | 8/2014 | Poremba et al. | |

OTHER PUBLICATIONS

Office Action for foreign counterpart Taiwan Application No. 104136669, dated Oct. 14, 2016, 13 pages.

Decision of Rejection for foreign counterpart Taiwan Application No. 104136669, dated May 26, 2017, 9 pages.

International Preliminary Report on Patentability for Application No. PCT/US2015/054963, dated Jun. 22, 2017, 7 pages.

* cited by examiner

VGATHERNSDPS dest, vindex, mem_addr(base_addr, index, scale, disp), k1 ← 402

(KL,VL) = (4,128), (8,256), (16, 512)    // valid options for (KL, VL) values ← 404

FOR j ← 0 to KL -1
   i ← j*32
   IF k1[j]    // k1 is a mask register
     THEN
        dest[i+31:i] ← NS_EM[base_addr + SignExtend(vindex[i+31:i])*scale + disp]
        k1[j] = 0    // indicates success for element j
     ELSE
        dest[i+31:i] ← dest[i+31:i]    // dest remains unchanged
   FI;
END FOR

VMOVSTRIDENSDPS dest, stride, base_mem_addr, k1   ← 452

(KL,VL) = (4,128), (8,256), (16, 512)    // valid options for (KL, VL) values   ← 454

FOR j ← 0 to KL -1   ⎫

I ← j*32

IF k1[j]    // k1 is a mask register

THEN dest[i+31:i] ← NS_EM[base_mem_addr + SignExtend(stride)]

k1[j] = 0    // indicates success for element j   ⎬ ← 456

ELSE dest[i+31:i] ← dest[i+31:i]    // dest remains unchanged

FI;

END FOR   ⎭

FIG. 4B

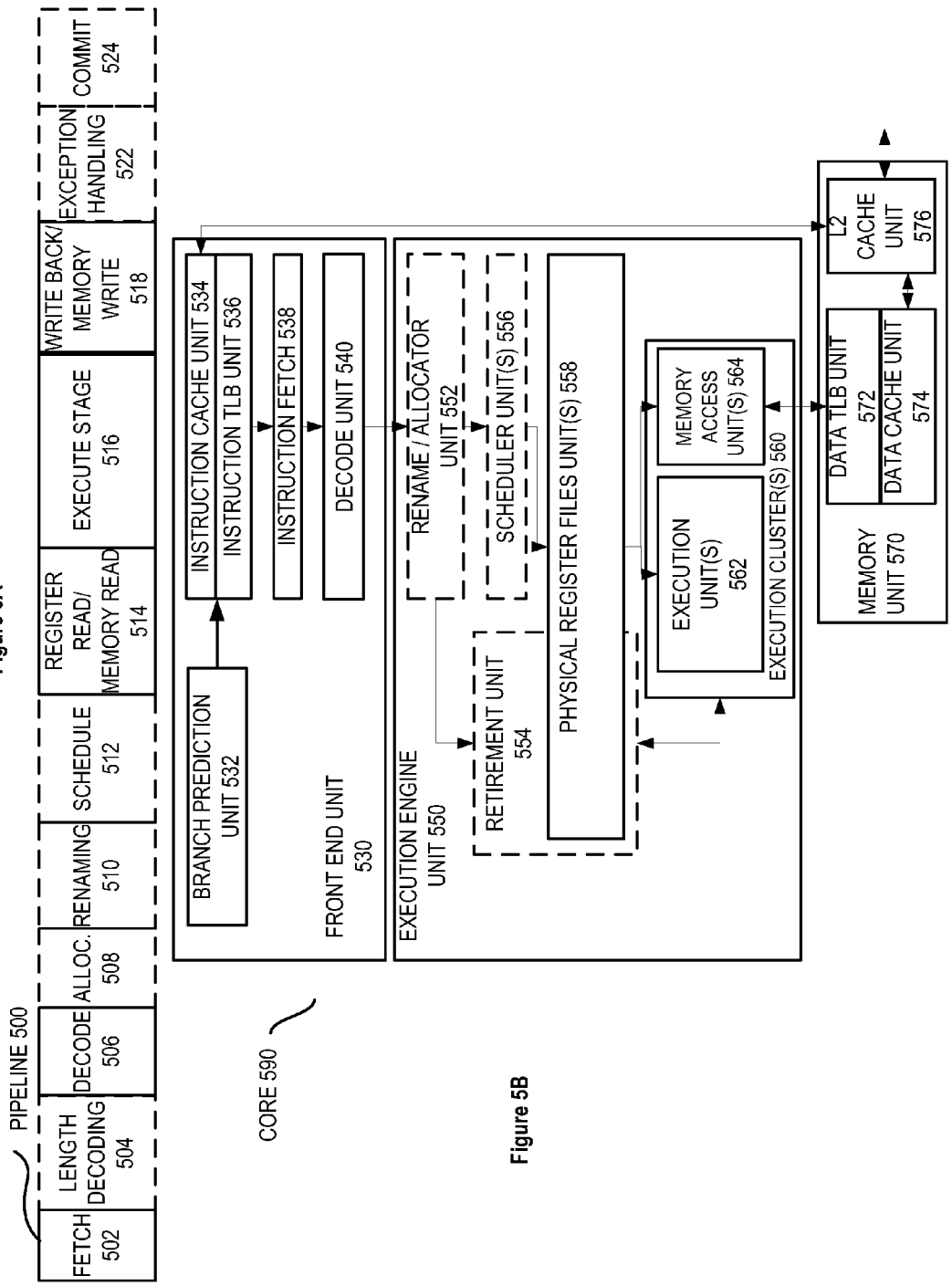

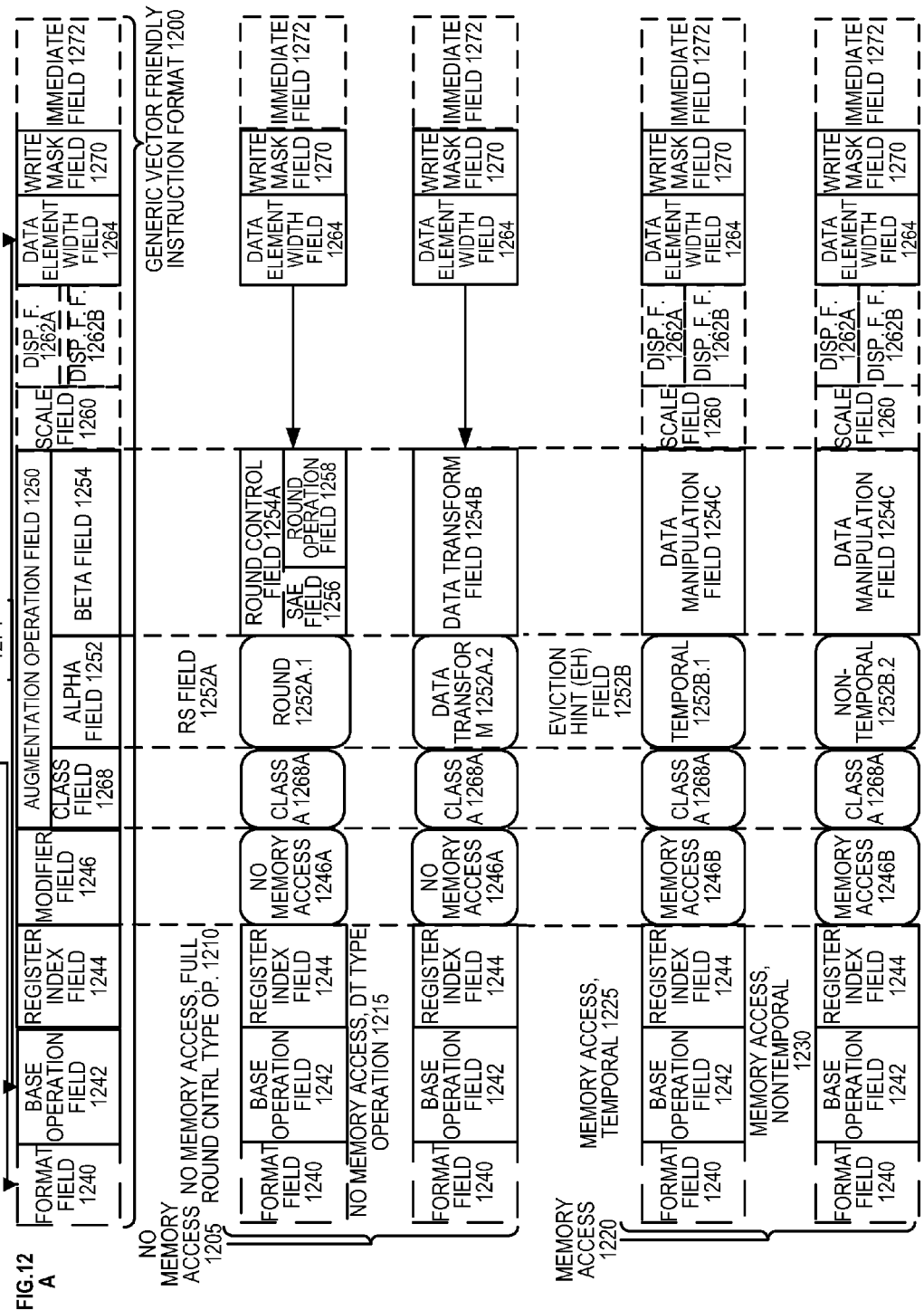

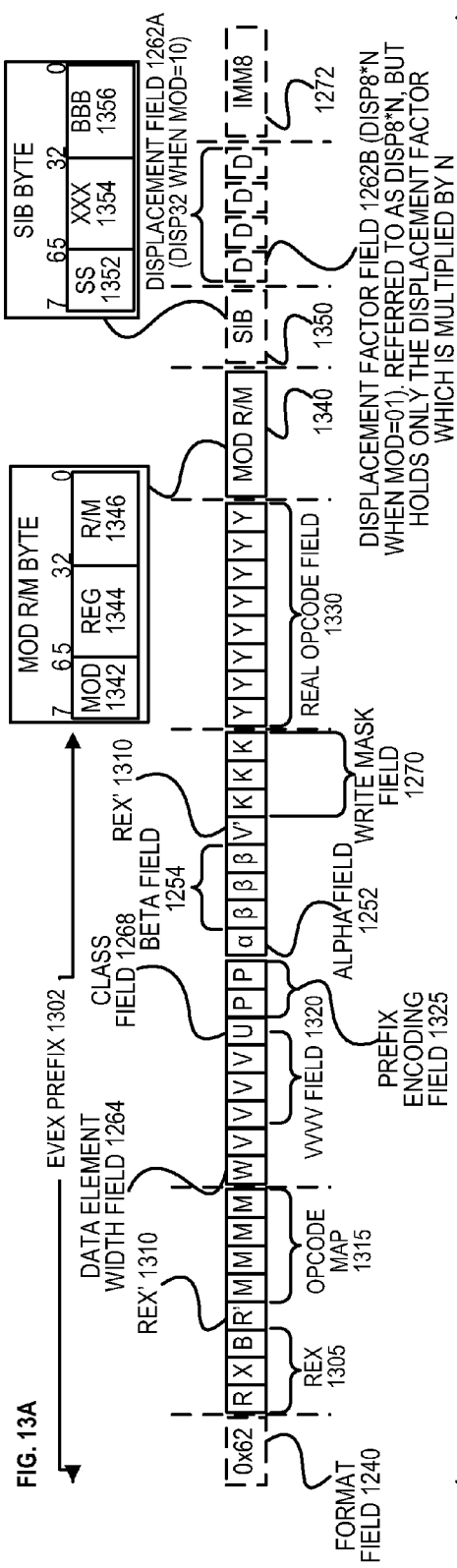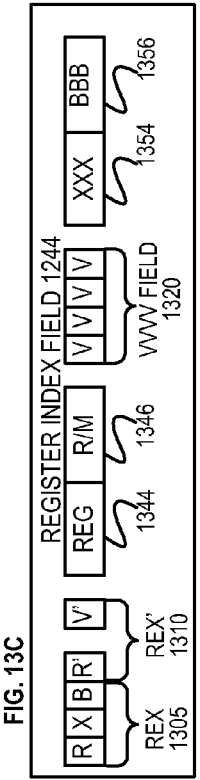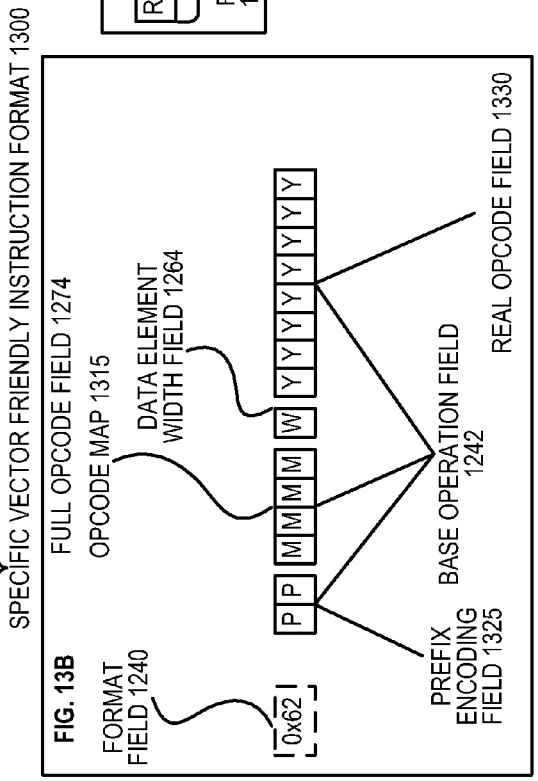
FIG. 13A
FIG. 13B
FIG. 13C

FIG. 14
REGISTER ARCHITECTURE 1400
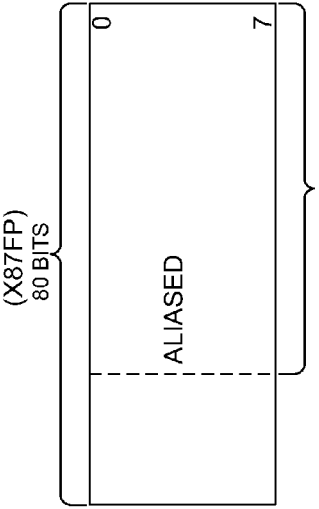
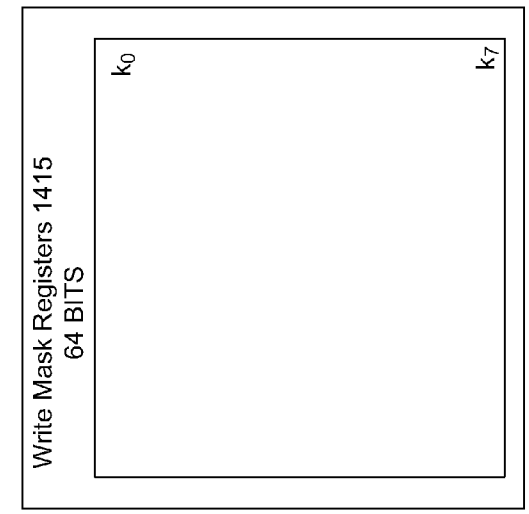
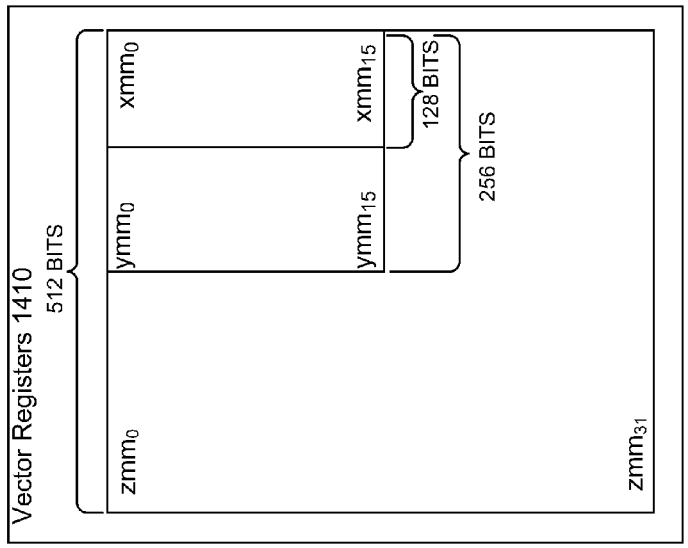

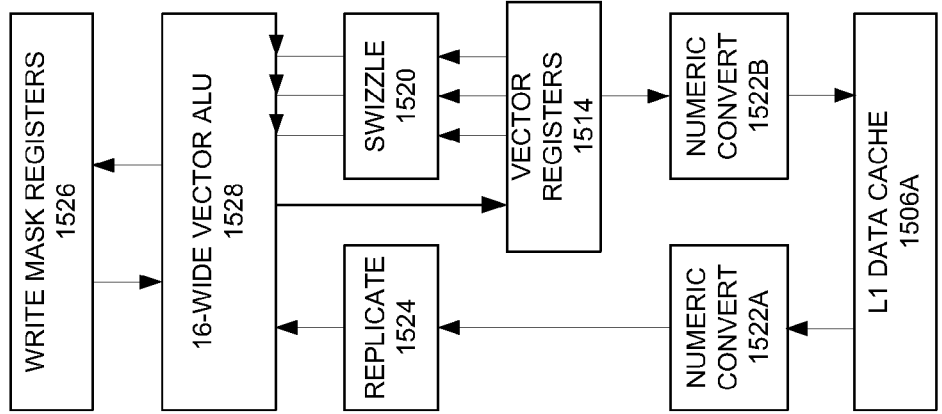
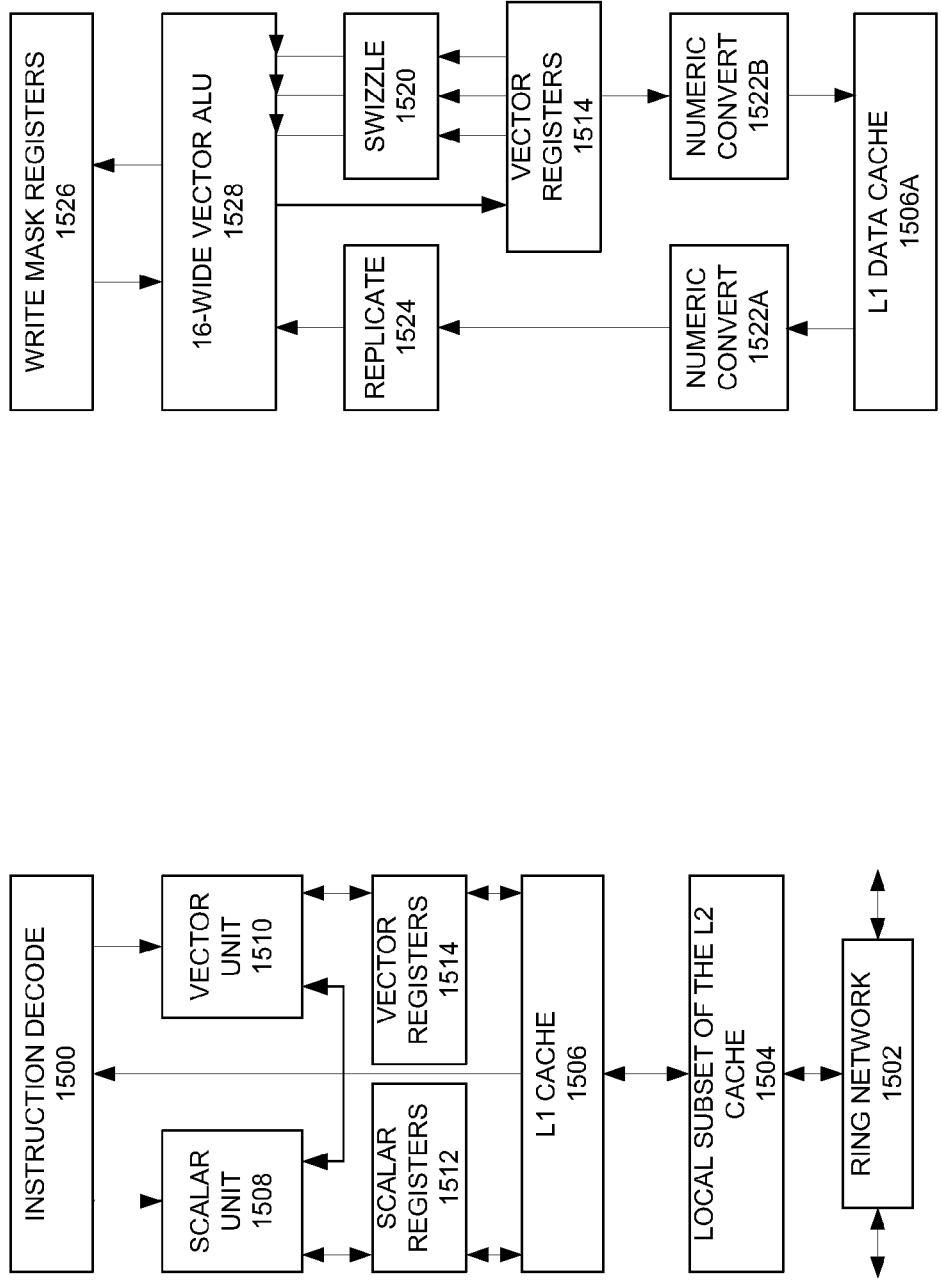

APPARATUS AND METHOD FOR CONSIDERING SPATIAL LOCALITY IN LOADING DATA ELEMENTS FOR EXECUTION

FIELD

This disclosure relates to microprocessors and, more particularly, to loading data elements for execution in the microprocessors.

BACKGROUND

The stride of an array (also referred to as increment, pitch, or step size) refers to the distance between two memory locations that the successive array elements of the array begin. Many scientific applications have arrays with large strides. These occur naturally when for example:

Accessing matrices (or 2D/3D arrays). If one accesses the elements of the same column sequentially such as A[0][3], A[1][3], A[2][3] . . . .

Accessing the same number of structures organized as Array of Structures (AoS) such as A[0]•weight, A[1]•weight, A[2]•weight . . . .

Such strided access patterns are common in high performance computing (HPC) and scientific computing application due to the very nature of algorithms used. Many of these strided-accesses have large stride values, usually greater than the length of a cache line (e.g., 64 bytes). Such access do not have spatial locality. That is, if a data element X is accessed, the data elements that are close to data element X are no more likely to be accessed than the data elements far away from data element X.

BRIEF DESCRIPTION OF THE DRAWINGS

The present invention is illustrated by way of example, and not by way of limitation, in the figures of the accompanying drawings in which like references indicate similar elements.

FIG. 4A is a pseudo code illustrating one implementation of the type of instruction for loading a plurality of data elements without a fixed distance between successive data elements and without considering spatial locality according to one embodiment of the invention.

FIG. 4B is another pseudo code illustrating one implementation of the type of instruction for loading a plurality of data elements with a fixed distance between successive data elements and without considering spatial locality according to one embodiment of the invention.

FIG. 5A is a block diagram illustrating both an exemplary in-order pipeline and an exemplary register renaming, out-of-order issue/execution pipeline according to embodiments of the invention.

FIG. 5B is a block diagram illustrating both an exemplary embodiment of an in-order architecture core and an exemplary register renaming, out-of-order issue/execution architecture core to be included in a processor according to embodiments of the invention.

FIGS. 12A and 12B are block diagrams illustrating a generic vector friendly instruction format and instruction templates thereof according to embodiments of the invention.

FIGS. 13A-D are block diagrams illustrating an exemplary specific vector friendly instruction format according to embodiments of the invention.

FIG. 14 is a block diagram of a register architecture according to one embodiment of the invention.

FIG. 15A is a block diagram of a single processor core, along with its connection to the on-die interconnect network and with its local subset of the Level 2 (L2) cache, according to embodiments of the invention.

FIG. 15B is an expanded view of part of the processor core in FIG. 14A according to embodiments of the invention.

DETAILED DESCRIPTION

Figure 1:
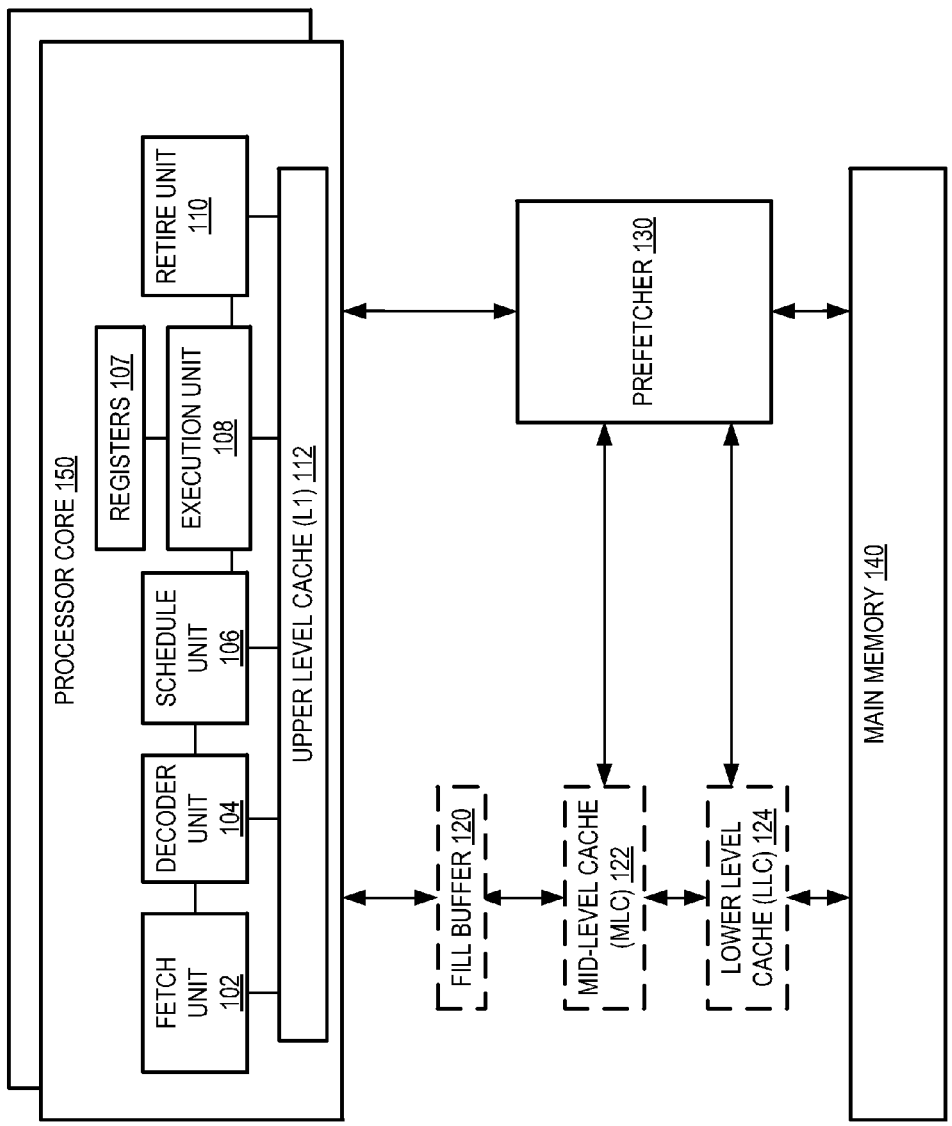
FIG. 1 illustrates a system architecture of a processor according to one embodiment of the invention.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art that the invention may be practiced without such specific details. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

In one embodiment of the invention, a processor for loading data elements in a processor is disclosed. The processor contains an upper level cache and at least one processor core coupled to the upper level cache. The processor core coupled to the upper level cache and it includes one or more registers and a plurality of instruction processing stages including a decoder unit and an execution unit. The decoder unit is configured to decode an instruction, where the instruction requires an input of a plurality of data elements, and where a size of each of the plurality of data elements is less than a cache line size of the processor. The execution unit is configured to load the plurality of data elements to the one or more registers, without loading data elements spatially adjacent to the plurality of data elements or the plurality of data elements in an upper level cache of the processor.

In one embodiment of the invention, a method for loading data elements in a processor is disclosed. The method includes decoding an instruction, where the instruction requires an input of a plurality of data elements, and where a size of each of the plurality of data elements is less than a cache line size of the processor. The method also includes, after decoding the instruction, loading the plurality of data elements to one or more registers of the processor, without loading data elements spatially adjacent to the plurality of data elements or the plurality of data elements in an upper level cache of the processor.

In one embodiment of the invention, a computer system is disclosed. The computer system contains a memory for storing instructions, a processor including an upper level cache, and at least one processor core for processing the instructions. The processor core coupled to the upper level cache and it includes one or more registers and a plurality of instruction processing stages including a decoder unit and an execution unit. The decoder unit is configured to decode an instruction, where the instruction requires an input of a plurality of data elements, and where a size of each of the plurality of data elements is less than a cache line size of the processor. The execution unit is configured to load the plurality of data elements to the one or more registers, without loading data elements spatially adjacent to the plurality of data elements or the plurality of data elements in an upper level cache of the processor.

Instruction Set

An instruction set, or instruction set architecture (ISA), is the part of the computer architecture related to programming, and may include the native data types, instructions, register architecture, addressing modes, memory architecture, interrupt and exception handling, and external input and output (I/O). The term instruction generally refers herein to macro-instructions—that is instructions that are provided to the processor (or instruction converter that translates (e.g., using static binary translation, dynamic binary translation including dynamic compilation), morphs, emulates, or otherwise converts an instruction to one or more other instructions to be processed by the processor) for execution—as opposed to micro-instructions or micro-operations (micro-ops)—that is the result of a processor's decoder decoding macro-instructions.

The ISA is distinguished from the microarchitecture, which is the internal design of the processor implementing the instruction set. Processors with different microarchitectures can share a common instruction set. For example, Intel® Pentium 4 processors, Intel® Core™ processors, and processors from Advanced Micro Devices, Inc. of Sunnyvale Calif. implement nearly identical versions of the x86 instruction set (with some extensions that have been added with newer versions), but have different internal designs. For example, the same register architecture of the ISA may be implemented in different ways in different microarchitectures using well-known techniques, including dedicated physical registers, one or more dynamically allocated physical registers using a register renaming mechanism (e.g., the use of a Register Alias Table (RAT), a Reorder Buffer (ROB), and a retirement register file; the use of multiple maps and a pool of registers), etc. Unless otherwise specified, the phrases register architecture, register file, and register are used herein to refer to that which is visible to the software/programmer and the manner in which instructions specify registers. Where a specificity is desired, the adjective logical, architectural, or software visible will be used to indicate registers/files in the register architecture, while different adjectives will be used to designation registers in a given microarchitecture (e.g., physical register, reorder buffer, retirement register, register pool).

An instruction set includes one or more instruction formats. A given instruction format defines various fields (number of bits, location of bits) to specify, among other things, the operation to be performed (opcode) and the operand(s) on which that operation is to be performed. Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands.

Scientific, financial, auto-vectorized general purpose, RMS (recognition, mining, and synthesis), and visual and multimedia applications (e.g., 2D/3D graphics, image processing, video compression/decompression, voice recognition algorithms and audio manipulation) often require the same operation to be performed on a large number of data items (referred to as "data parallelism"). Single Instruction Multiple Data (SIMD) refers to a type of instruction that causes a processor to perform an operation on multiple data items. SIMD technology is especially suited to processors that can logically divide the bits in a register into a number of fixed-sized data elements, each of which represents a separate value. For example, the bits in a 256-bit register may be specified as a source operand to be operated on as four separate 64-bit packed data elements (quad-word (Q) size data elements), eight separate 32-bit packed data elements (double word (D) size data elements), sixteen separate 16-bit packed data elements (word (W) size data elements), or thirty-two separate 8-bit data elements (byte (B) size data elements). This type of data is referred to as packed data type or vector data type, and operands of this data type are referred to as packed data operands or vector operands. In other words, a packed data item or vector refers to a sequence of packed data elements, and a packed data operand or a vector operand is a source or destination operand of a SIMD instruction (also known as a packed data instruction or a vector instruction).

By way of example, one type of SIMD instruction specifies a single vector operation to be performed on two source vector operands in a vertical fashion to generate a destination vector operand (also referred to as a result vector operand) of the same size, with the same number of data elements, and in the same data element order. The data elements in the source vector operands are referred to as source data elements, while the data elements in the destination vector operand are referred to a destination or result data elements. These source vector operands are of the same size and contain data elements of the same width, and thus they contain the same number of data elements. The source data elements in the same bit positions in the two source vector operands form pairs of data elements (also referred to as corresponding data elements; that is, the data element in data element position 0 of each source operand correspond, the data element in data element position 1 of each source operand correspond, and so on). The operation specified by that SIMD instruction is performed separately on each of these pairs of source data elements to generate a matching number of result data elements, and thus each pair of source data elements has a corresponding result data element. Since the operation is vertical and since the result vector operand is the same size, has the same number of data elements, and the result data elements are stored in the same data element order as the source vector operands, the result data elements are in the same bit positions of the result vector operand as their corresponding pair of source data elements in the source vector operands. In addition to this exemplary type of SIMD instruction, there are a variety of other types of SIMD instructions (e.g., that has only one or has more than two source vector operands, that operate in a horizontal fashion, that generates a result vector operand that is of a different size, that has a different size data elements, and/or that has a different data element order). It should be understood that the term destination vector operand (or destination operand) is defined as the direct result of performing the operation specified by an instruction, including the storage of that destination operand at a location (be it a register or at a memory address specified by that instruction) so that it may be accessed as a source operand by another instruction (by specification of that same location by the another instruction).

The SIMD technology, such as that employed by the Intel® Core™ processors having an instruction set including x86, MMX™, Streaming SIMD Extensions (SSE), SSE2, SSE3, SSE4.1, and SSE4.2 instructions, has enabled a significant improvement in application performance. An additional set of SIMD extensions, referred to the Advanced Vector Extensions (AVX) (AVX1 and AVX2) and using the Vector Extensions (VEX) coding scheme, has been, has been released and/or published (e.g., see Intel® 64 and IA-32 Architectures Software Developers Manual, October 2011; and see Intel® Advanced Vector Extensions Programming Reference, June 2011).

System Architecture

FIG. 1 illustrates a system architecture of a processor according to one embodiment of the invention. The processor 100 contains one or more processor cores such as a processor core 150, a prefetcher 130, and a main memory 140. It may optionally include a lower level cache (LLC) 124, a mid-level cache (MLC) 122, and/or a fill buffer 120 in one embodiment. The processor is a part of a computing system in one embodiment.

Processor core 150 may be implemented on a single integrated circuit chip (or die). Moreover, the chip may include one or more shared and/or private caches (LLC 124 or MLC 122), interconnections, memory controllers, or other components.

Processor core 150 may include a fetch unit 102 to fetch instructions for execution by the processor core. The instructions may be fetched from any storage devices such as main memory 140 and/or the memory devices discussed with reference to FIGS. 7-9. Processor core 150 may optionally include a decode unit 104 to decode the fetched instructions. In an embodiment, the decode unit 104 may decode the fetched instruction into a plurality of uops (micro-operations). Some embodiments of the processor core 150 may not include decode unit 104. Hence, the core 150 may process instructions without decoding them. Additionally, the core 150 may include a schedule unit 106. The schedule unit 106 may perform various operations associated with storing decoded instructions (e.g., received from the decode unit 104) until the instructions are ready for dispatch, e.g., until all source values of a decoded instruction become available. In one embodiment, the schedule unit 106 may schedule and/or issue (or dispatch) decoded instructions to an execution unit 108 for execution.

The execution unit 108 may execute the dispatched instructions after they are decoded (e.g., by the decode unit 104) and dispatched (e.g., by the schedule unit 106). The execution unit 108 utilizes one or more registers 107 for execution. The registers 107 may store instructions or data elements to be executed for the instructions. In an embodiment, the execution unit 108 may include more than one execution unit, such as one or more memory execution units, one or more integer execution units, one or more floating-point execution units, or other execution units. The execution unit 108 may also perform various arithmetic operations such as addition, subtraction, multiplication, and/or division, and may include one or more arithmetic logic units (ALUs). In an embodiment, a co-processor (not shown) may perform various arithmetic operations in conjunction with the execution unit 108. Further, the execution unit 108 may execute instructions out-of-order. Hence, the processor core 150 may be an out-of-order processor core in one embodiment. Also, each core 150 may be capable of executing multiple threads simultaneously (SMT or Simultaneous Multi-Threading).

The processor core 150 may also include a retirement unit 110. The retirement unit 110 may retire executed instructions (e.g., in order) after they are committed. In an embodiment, retirement of the executed instructions may result in processor state being committed from the execution of the instructions, physical registers used by the instructions being de-allocated, etc.

The processor core 150 may also include an upper level cache (L1) 112. L1 112 is close to or within processor core 150 and it is the highest level cache in the cache hierarchy and it generally stores instructions/data elements for executing instructions in the execution pipeline such as 102-110. L1 112 is dedicated to processor core 150, even when there are multiple processor cores in processor 100.

MLC 122 and LLC 124 are caches in lower levels of the cache hierarchy, and they store instructions/data elements to facilitate instruction executing by processor cores. Fill buffer 120 is a temporary buffer to store and gather data elements for execution in one embodiment.

The processor may also include a prefetcher 130. The prefetcher 130 fetches instructions/data elements from MLC 122, LLC 124, and/or main memory 140 before the instructions/data elements are requested by a processor core such as processor core 150. Prefetcher 130 speeds up execution of the processor cores by shortening the access time of instructions/data.

A cache often increases in performance the closer it resides to execution units. In addition, the caches closer to execution units of a processor typically are smaller and quicker than larger higher-level caches (e.g., L1 112 is smaller and quicker than MLC 122 and LLC 124). A fundamental principle of caching is that for the data cached, the more likely the data cached is to be reused, the better. Caching is generally performed based on the principle of locality, which says that execution of instructions accesses a relatively small portion of the address space at any instant of time. There are two types of localities: Temporal locality and spatial locality. Temporal locality is the locality in time, which means that if an item is referenced, it will tend to be referenced again soon.

Spatial locality is the locality in space. That is, if an item is referenced, items whose addresses are closed by (i.e., spatially adjacent) tend to be referenced soon. For arrays with large strides, the stride access patterns often present low spatial locality, thus how to load these data elements worth further examination.

Operations of Considering Spatial Locality in Loading Data Elements

Figure 2:
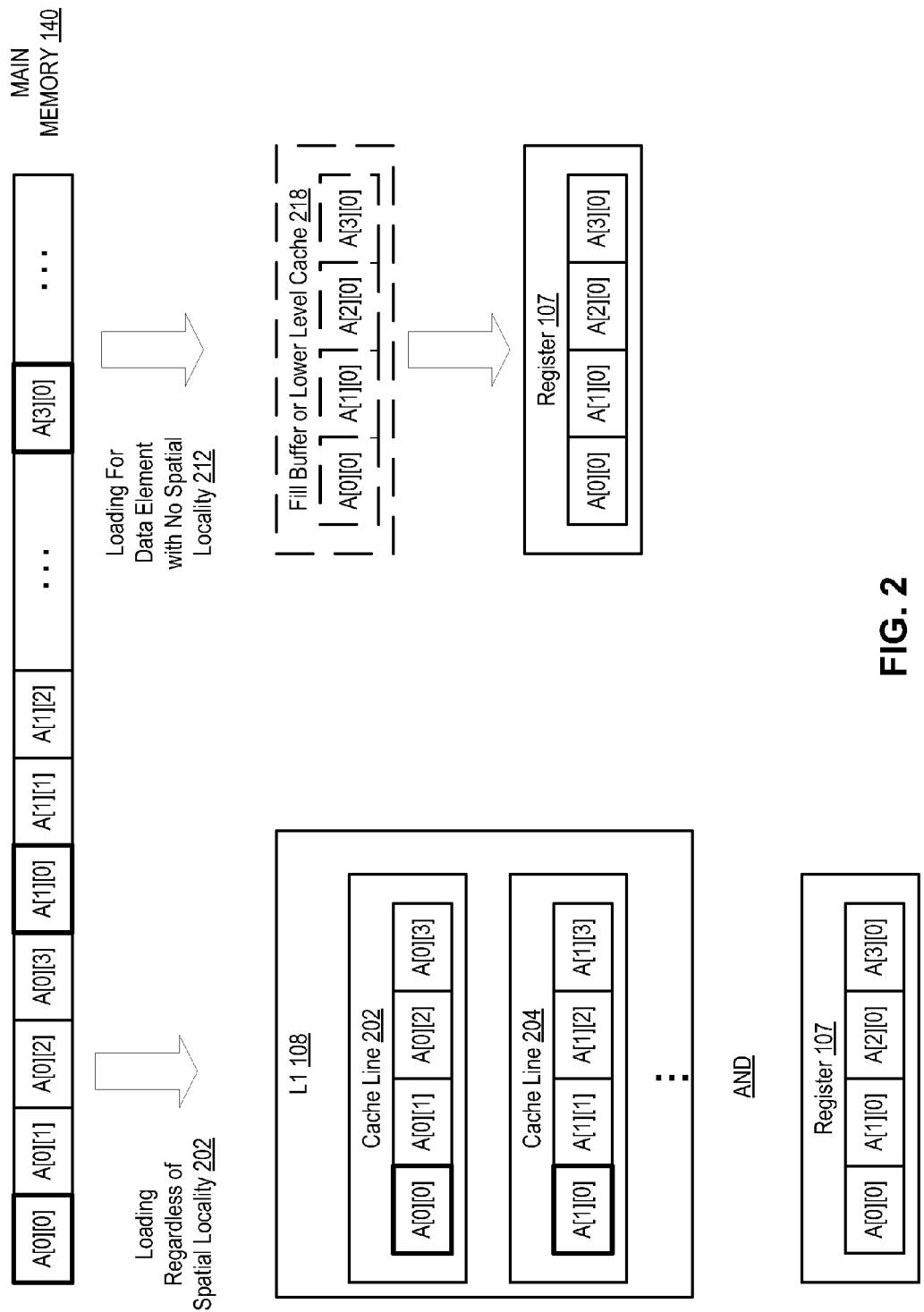
FIG. 2 illustrates comparison of operations with and without considering locality in loading data elements according to embodiments of the invention.

FIG. 2 illustrates comparison of operations with and without considering locality in loading data elements according to embodiments of the invention. Within main memory 140, a matrix A is stored. Assume that for an instruction, the data elements of the first column of matrix A is to be accessed, i.e., A[0][0], A[1][0], A[2][0], and A[3][0] are to be executed by the execution unit. In addition, assume each data element is 4 bytes long and each cache line is 64 bytes long. The blocks following reference 202 at the left side of the figure illustrate the loading known in the art, where the loading is performed without considering spatial locality of the required data elements. The blocks following reference 212 at the right side of the figure illustrate the loading according to embodiment of the invention, where the loading is performing considering that there is no spatial locality of the required data elements.

When loading is performed without considering spatial locality of the required data elements, the required data elements A[0][0]-A[3][0] are loaded in the register 107 of the processor core as needed for execution. In addition though, the request of A[0][0] by the processor core causes loading of A[0][0] and data elements spatially adjacent to A[0][0] to cache line 202 of L1 108, the spatially adjacent data element including A[0][1]-A[0][3]. Similarly, the request of A[1][0] causes loading of A[1][0]-A[1][3] to cache line 204 of L1 108, and the request of A[2][0] and A[3][0] causes loading of A[2][0]-A[2][3] and A[3][0]-A[3][3] respectively to cache lines of L1 108. In addition, for an implementation that second-sector (next-line) prefetching is enabled, 4 more cache lines of MLC or LLC are loaded (not shown) for the requested loading of the first column of matrix A. That is, for accessing 4*4=16 bytes, 64 bytes (cache line length)*8 (4 cache lines at L1 and MLC/LLC each)=512 bytes cache space and processing power are used. That is, only 3.125% of data in the cache data are actually used.

While the illustration is a simple example, the loading of multiple data elements without spatial locality happens often, particularly for array access where an array has a large stride (e.g., larger than 64 bytes). The waste of storage/computation resource through indiscriminately loading spatially adjacent data elements in cache lines is significant. Thus embodiments of the invention perform loading with consideration spatial locality of the required data elements.

At reference 212, the required data elements, A[0][0]-A[3][0], are loaded only in the register 107. They are not loaded in the upper level cache (L1) or MLC thus not take cache spaces. Optionally the required data elements may be gathered in a fill buffer such as fill buffer 120 or a lower level cache such as LLC 124. One difference to the approach of reference 202 is that the gathering in the fill buffer or the LLC applies only to the required data elements, and the spatially adjacent data elements are not loaded to the fill buffer or the LLC. The targeted loading avoids taking cache space/computation resources at L1 and/or MLC, and the resulting more resources for the smaller/quicker caches closer to the execution unit improves the performance of the execution thus the performance of the processor.

In one embodiment of the invention, a processor is able to perform operations both types of loading as referred to in references 202 and 212. The different loading operations are performed based on the instruction types.

Figure 3A:
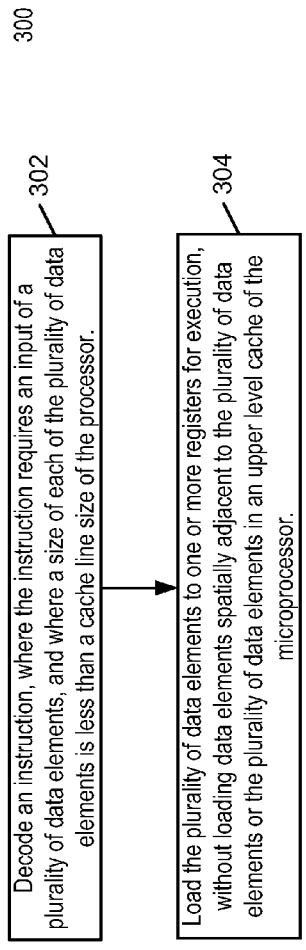
FIGS. 3A-B are flow diagrams illustrating the method of considering locality in loading data elements for executing in a processor according to one embodiment of the invention.
Figure 3B:
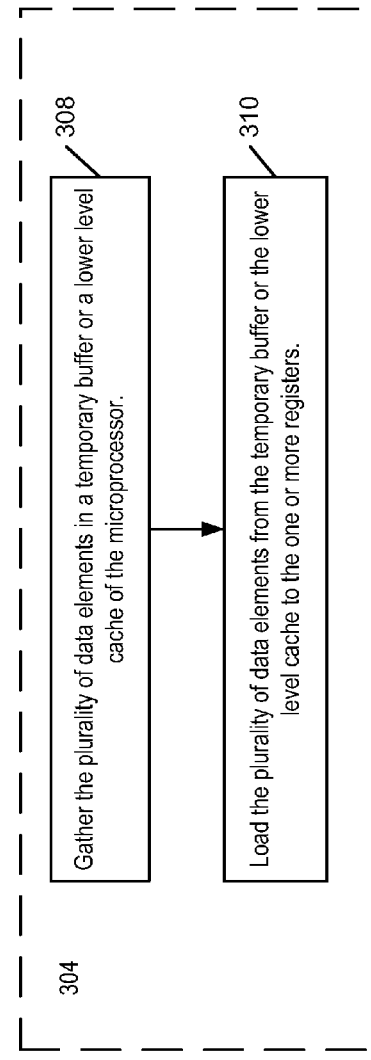

FIGS. 3A-B are flow diagrams illustrating the method of considering locality in loading data elements for executing in a processor according to one embodiment of the invention. Method 300 may be performed by a processor such as processor 100.

At reference 302, an instruction is decoded, and the instruction requires an input of a plurality of data elements. The size of each of the plurality of data elements is less than the cache line size of the processor. The plurality of data elements may be an array or a vector. The instruction may be an instruction specifically for loading the plurality of data elements without considering spatial locality of the data elements, such as variations of instructions VGATHERNS (short for "Vector Gather No-Spatial") and VMOVSTRIDENS (short for "Vector Move Stride No-Spatial") as discussed in more details herein below In one embodiment, the instruction (e.g., VMOVSTRIDENS) specifies a stride value between data elements of the plurality of data elements. In one embodiment, the stride value is bigger than the cache line size of the processor. In an alternative embodiment, the instruction (e.g., VGATHERNSDPS) specifies an index corresponding to locations of each of the plurality of data elements.

At reference 304, after decoding the instruction, the plurality of data elements are loaded to one or more registers of the processor, without loading data elements spatially adjacent to the plurality of data elements or the plurality of data elements in an upper level (L1) cache of the processor. That is, the loading of any data element to the upper level cache is not initiated for executing the decoded instruction, execution of which requires the plurality of data elements. In one embodiment, the loading of any data element to the mid-level cache (MLC) is not initiated for executing the decoded instruction either.

In one embodiment, as illustrated in FIG. 3B, the operations in reference 304 are performed through at least two steps. At reference 308, the plurality of data elements are gathered in a temporary buffer or a lower level cache (LLC) of the processor. Then at reference 310, the plurality of data elements are loaded from the temporary buffer or the LLC to the one or more registers of the processor.

The loaded plurality of data elements are then executed by subsequent instructions. Note the processor is able to perform loading without considering spatial locality in embodiment. For example, the processor may load one data element along with its spatially adjacent data elements to the L1 cache. In load a plurality of data elements, a decoded instruction may cause the processor to load the plurality of data elements along with spatially adjacent data elements to the L1 cache. In one embodiment, the difference in loading behavior depends on what instruction is decoded according one embodiment of the invention, and if the loading instruction does not specify the load is for no spatial locality data elements, the loading will cause the processor to load data element along with spatially adjacent data elements.

Pseudo Codes Implementing the Instructions

In one embodiment, two types of instructions are used to indicate the execution of the instructions requires an input of data elements where spatial locality is not to be considered. One type of instruction is for loading a plurality of data elements without a fixed distance (a stride) between successive data elements, and it is denoted as VGATHERNS. The other type of instruction is for loading a plurality of data elements with a known stride value, and it is denoted VMOVSTRIDENS. Obviously, the names of the instructions and division of the instruction types may be implemented in a variety of ways, and a person in the skill of the art may use the principle disclosed within the embodiments of the invention and generate different set of instructions for loading a plurality of data elements, where spatial locality is not to be considered.

FIG. 4A is a pseudo code illustrating one implementation of the type of instruction for loading a plurality of data elements without a fixed distance between successive data elements and without considering spatial locality according to one embodiment of the invention. The illustrated VGATHERNS instruction is for index register (vindex) being double-word integer (denoted as "D") and the data type of data elements gathered from memory being packed single-precision floating-point (denoted as PS), thus it is VGATHERNSDPS. The index register may also be quad word (denoted as "Q); and the data type of data elements may also be PD (packed double-precision).

As illustrated at reference 402, VGATHERNSDPS requires several input parameters: a destination register address, dest; an index register, vindex; a base memory address, mem_addr, and a mask register, k1. The base memory address is provided using a base address (base_addr), an index value (index using vindex), a scale value (scale), and a displacement (disp). The parameter mem_addr is specified to require multiple parameters such as base_addr, index, scale, and disp in one embodiment.

At reference 404, the (KL, VL) pair describes how many data elements are there in a given vector length. For example, (4, 128) represents 4 single precision data elements can fit in a 128 bit vector length, thus it is a valid option for (KL, VL) value.

For each data element, based on an indication of the mask register (e.g., k1[j]==1), if the loading is to be performed, the NS_EM operation loads the requested data in the memory address (specified as base_addr+SignExtend(vindex[i+31:i]*scale+disp). SignExtend is for preserving the positive/negative sign of vindex while increasing the number of bits of vindex. Note NS_EM only loads the data elements to the destination register from last level cache without loading the data in the L1 cache (unless a data element is already present in L1 cache, in which case, the data is read from the L1 cache). If based on the indication of the mask register the loading is not be performed, the destination register remains unchanged. The operations of reference 406 are performed for each data element, and the data elements are loaded to the destination register based on the mask register indication.

Through the gather operation, multiple data elements are gathered from memory. For example, if mem_addr=1000 and vindex={10, 220, 32, 8}, the data elements at 1010, 1220, 1032, and 1008 will be loaded into the destination register, dist.

While VGATHERNS may gather data elements residing in a memory in various locations (the combination of base_addr, index, scale, disp can pinpoint the data elements in the memory), for accessing data elements with a known stride value, a different instruction may be used. FIG. 4B is another pseudo code illustrating one implementation of the type of instruction for loading a plurality of data elements with a fixed distance between successive data elements and without considering spatial locality according to one embodiment of the invention. The illustrated VMOVSTRIDENSDPS instruction is for a stride value (stride) being double-word integer (denoted as "D") and the data type of data elements gathered from memory being packed single-precision floating-point (denoted as PS), thus it is VMOVSTRIDENSDPS.

As illustrated at reference 452, VMOVSTRIDENSDPS requires several input parameters: a destination register address, dest; a stride, stride; a base memory address, base_mem_addr, and a mask register, k1. The parameters dest and k1 are defined as the same as VGATHERNSDPS. The base memory address is a usual memory address, similar to mem_addr above. The parameter stride is a scalar integer value stored in a source register.

At reference 454, the (KL, VL) pair describes how many data elements are there in a given vector length, similar to reference 404.

For each data element, based on an indication of the mask register (e.g., k1[j]==1), if the loading is to be performed, the NS_EM operation loads the requested data in the memory address (specified as base_addr+Sign Extend (stride). If based on the indication of the mask register, the loading is not be performed, the destination register remains unchanged. The operations of reference 456 are performed for each data element, and the data elements are loaded to the destination register based on the mask register indication.

Exemplary Processor Architectures and Data Types

FIG. 5A is a block diagram illustrating both an exemplary in-order pipeline and an exemplary register renaming, out-of-order issue/execution pipeline according to embodiments of the invention. FIG. 5B is a block diagram illustrating both an exemplary embodiment of an in-order architecture core and an exemplary register renaming, out-of-order issue/execution architecture core to be included in a processor according to embodiments of the invention. The solid lined boxes in FIGS. 5A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 5A, a processor pipeline 500 includes a fetch stage 502, a length decode stage 504, a decode stage 506, an allocation stage 508, a renaming stage 510, a scheduling (also known as a dispatch or issue) stage 512, a register read/memory read stage 514, an execute stage 516, a write back/memory write stage 518, an exception handling stage 522, and a commit stage 524.

FIG. 5B shows processor core 590 including a front end unit 530 coupled to an execution engine unit 550, and both are coupled to a memory unit 570. The core 590 may be a reduced instruction set computing (RISC) core, a complex instruction set computing (CISC) core, a very long instruction word (VLIW) core, or a hybrid or alternative core type. As yet another option, the core 590 may be a special-purpose core, such as, for example, a network or communication core, compression engine, coprocessor core, general purpose computing graphics processing unit (GPGPU) core, graphics core, or the like.

The front end unit 530 includes a branch prediction unit 532 coupled to an instruction cache unit 534, which is coupled to an instruction translation lookaside buffer (TLB) 536, which is coupled to an instruction fetch unit 538, which is coupled to a decode unit 540. The decode unit 540 (or decoder) may decode instructions, and generate as an output one or more micro-operations, micro-code entry points, microinstructions, other instructions, or other control signals, which are decoded from, or which otherwise reflect, or are derived from, the original instructions. The decode unit 540 may be implemented using various different mechanisms. Examples of suitable mechanisms include, but are not limited to, look-up tables, hardware implementations, programmable logic arrays (PLAs), microcode read only memories (ROMs), etc. In one embodiment, the core 590 includes a microcode ROM or other medium that stores microcode for certain macroinstructions (e.g., in decode unit 540 or otherwise within the front end unit 530). The decode unit 540 is coupled to a rename/allocator unit 552 in the execution engine unit 550.

The execution engine unit 550 includes the rename/allocator unit 552 coupled to a retirement unit 554 and a set of one or more scheduler unit(s) 556. The scheduler unit(s) 556 represents any number of different schedulers, including reservations stations, central instruction window, etc. The scheduler unit(s) 556 is coupled to the physical register file(s) unit(s) 558. Each of the physical register file(s) units 558 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 558 comprises a vector registers unit, a write mask registers unit, and a scalar registers unit. These register units may provide architectural vector registers, vector mask registers, and general purpose registers. The physical register file(s) unit(s) 558 is overlapped by the retirement unit 554 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 554 and the physical register file(s) unit(s) 558 are coupled to the execution cluster(s) 560. The execution cluster(s) 560 includes a set of one or more execution units 562 and a set of one or more memory access units 564. The execution units 562 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 556, physical register file(s) unit(s) 558, and execution cluster(s) 560 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 564). It should also be understood that where separate pipelines are used, one or more of these pipelines may be out-of-order issue/execution and the rest in-order.

The set of memory access units 564 is coupled to the memory unit 570, which includes a data TLB unit 572 coupled to a data cache unit 574 coupled to a level 2 (L2) cache unit 576. In one exemplary embodiment, the memory access units 564 may include a load unit, a store address unit, and a store data unit, each of which is coupled to the data TLB unit 572 in the memory unit 570. The instruction cache unit 534 is further coupled to a level 2 (L2) cache unit 576 in the memory unit 570. The L2 cache unit 576 is coupled to one or more other levels of cache and eventually to a main memory.

By way of example, the exemplary register renaming, out-of-order issue/execution core architecture may implement the pipeline 500 as follows: 1) the instruction fetch 538 performs the fetch and length decoding stages 502 and 504; 2) the decode unit 540 performs the decode stage 506; 3) the rename/allocator unit 552 performs the allocation stage 508 and renaming stage 510; 4) the scheduler unit(s) 556 performs the schedule stage 512; 5) the physical register file(s) unit(s) 558 and the memory unit 570 perform the register read/memory read stage 514; the execution cluster 560 perform the execute stage 516; 6) the memory unit 570 and the physical register file(s) unit(s) 558 perform the write back/memory write stage 518; 7) various units may be involved in the exception handling stage 522; and 8) the retirement unit 554 and the physical register file(s) unit(s) 558 perform the commit stage 524.

The core 590 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 590 includes logic to support a packed data instruction set extension (e.g., AVX1, AVX2, and/or some form of the generic vector friendly instruction format (U=0 and/or U=1), described below), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 534/574 and a shared L2 cache unit 576, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 6:
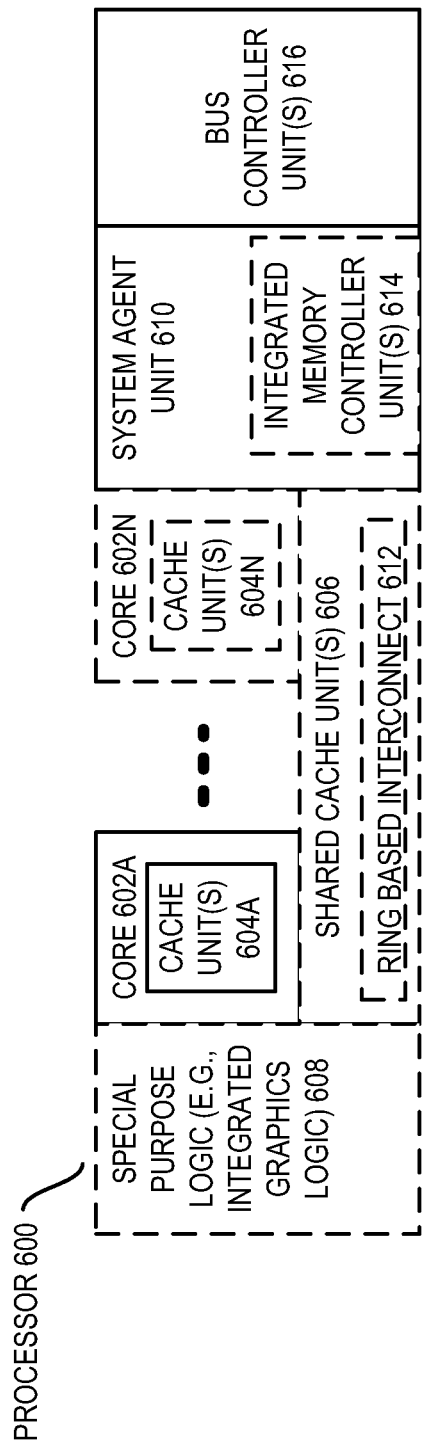
FIG. 6 is a block diagram of a single core processor and a multicore processor with integrated memory controller and graphics according to embodiments of the invention.

FIG. 6 is a block diagram of a processor 600 that may have more than one core, may have an integrated memory controller, and may have integrated graphics according to embodiments of the invention. The solid lined boxes in FIG. 6 illustrate a processor 600 with a single core 602A, a system agent 610, a set of one or more bus controller units 616, while the optional addition of the dashed lined boxes illustrates an alternative processor 600 with multiple cores 602A-N, a set of one or more integrated memory controller unit(s) 614 in the system agent unit 610, and special purpose logic 608.

Thus, different implementations of the processor 600 may include: 1) a CPU with the special purpose logic 608 being integrated graphics and/or scientific (throughput) logic (which may include one or more cores), and the cores 602A-N being one or more general purpose cores (e.g., general purpose in-order cores, general purpose out-of-order cores, a combination of the two); 2) a coprocessor with the cores 602A-N being a large number of special purpose cores intended primarily for graphics and/or scientific (throughput); and 3) a coprocessor with the cores 602A-N being a large number of general purpose in-order cores. Thus, the processor 600 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 600 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 606, and external memory (not shown) coupled to the set of integrated memory controller units 614. The set of shared cache units 606 may include one or more mid-level caches, such as level 2 (L2), level 3 (L3), level 4 (L4), or other levels of cache, a last level cache (LLC), and/or combinations thereof. While in one embodiment a ring based interconnect unit 612 interconnects the special purpose logic 608 (e.g., integrated graphics logic), the set of shared cache units 606, and the system agent unit 610/integrated memory controller unit(s) 614, alternative embodiments may use any number of well-known techniques for interconnecting such units. In one embodiment, coherency is maintained between one or more cache units 606 and cores 602-A-N.

In some embodiments, one or more of the cores 602A-N are capable of multi-threading. The system agent 610 includes those components coordinating and operating cores 602A-N. The system agent unit 610 may include for example a power control unit (PCU) and a display unit. The PCU may be or include logic and components needed for regulating the power state of the cores 602A-N and the integrated graphics logic 608. The display unit is for driving one or more externally connected displays.

The cores 602A-N may be homogenous or heterogeneous in terms of architecture instruction set; that is, two or more of the cores 602A-N may be capable of execution the same instruction set, while others may be capable of executing only a subset of that instruction set or a different instruction set.

Figure 7:
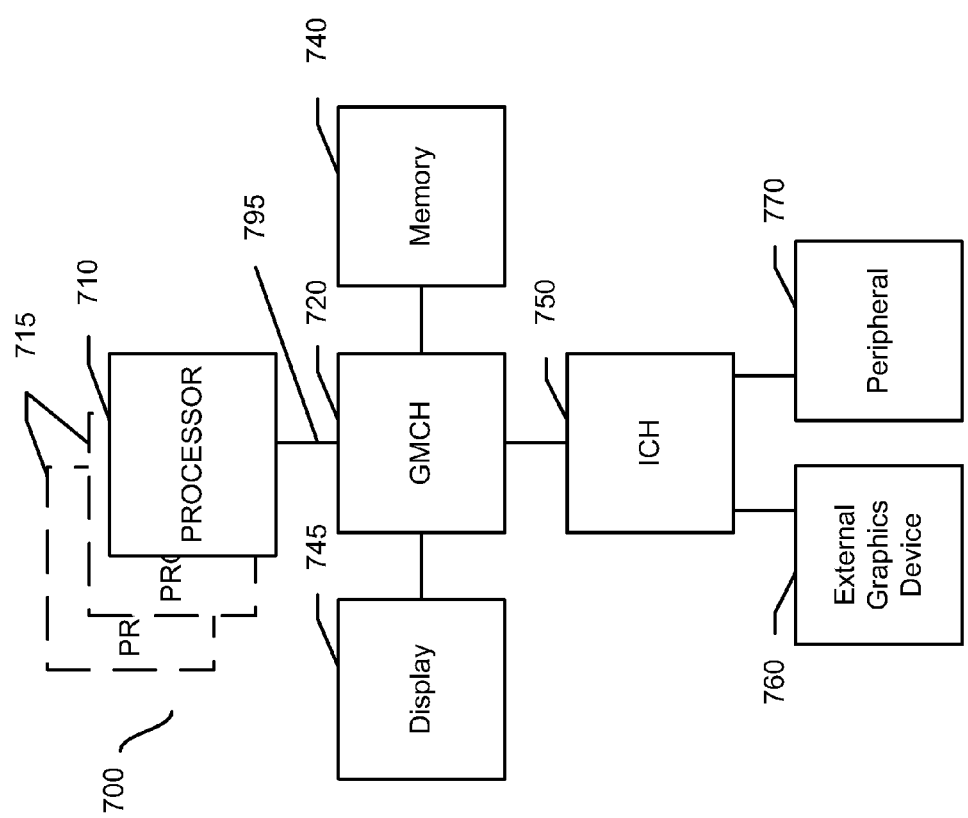
FIG. 7 is a block diagram of a system in accordance with one embodiment of the invention.
Figure 8:
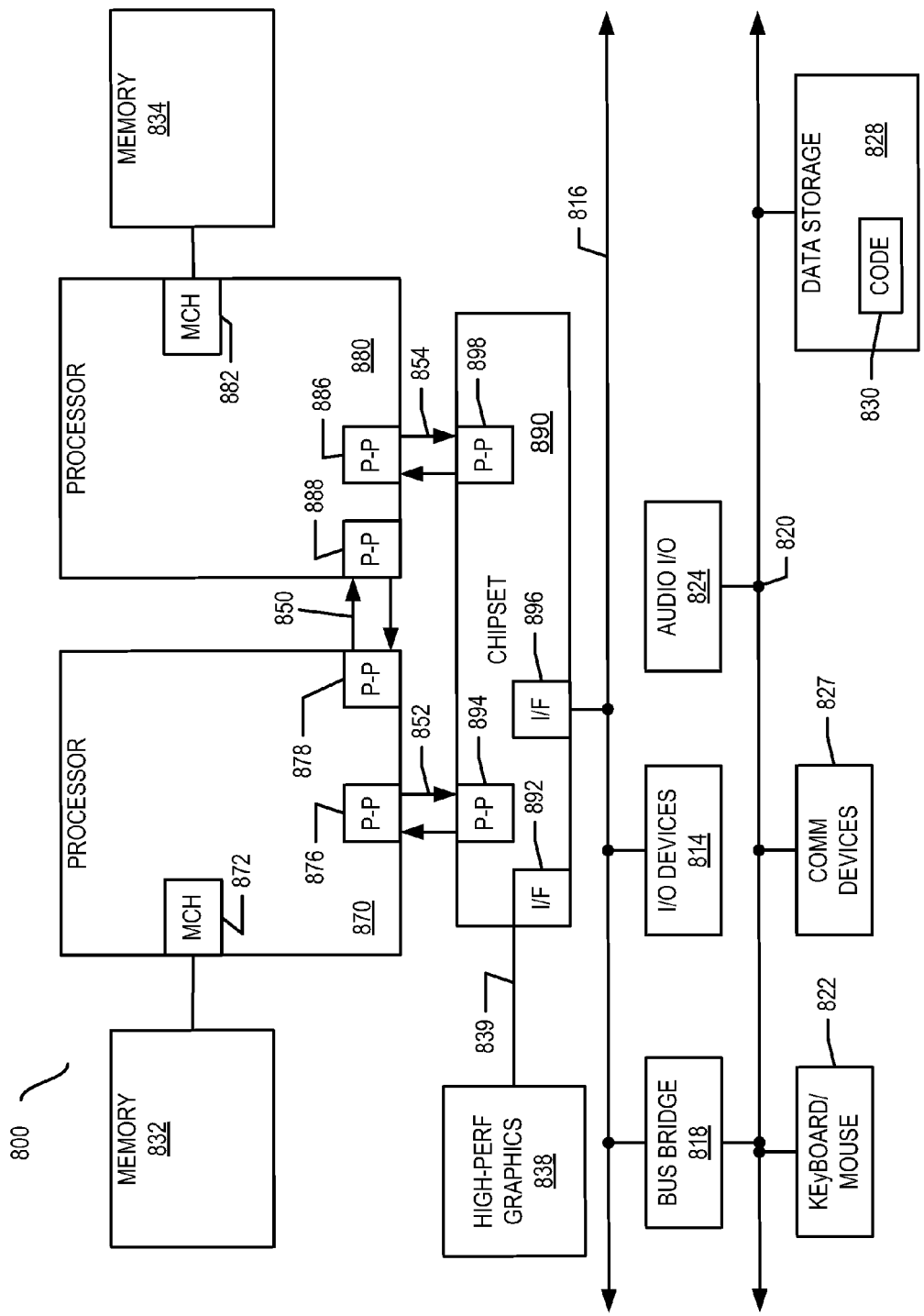
FIG. 8 is a block diagram of a second system in accordance with an embodiment of the invention.
Figure 9:
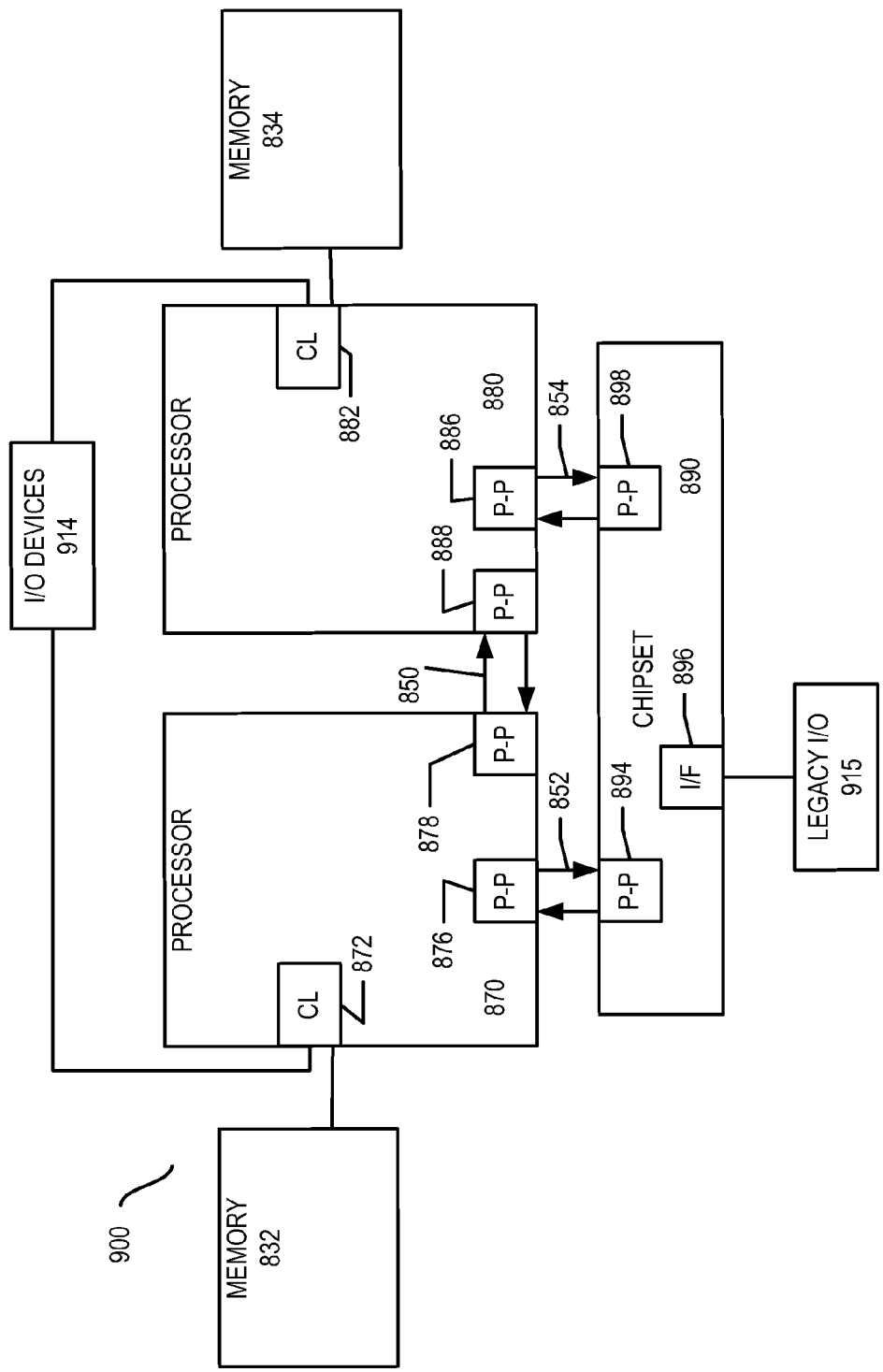
FIG. 9 is a block diagram of a third system in accordance with an embodiment of the invention.

FIGS. 7-9 are block diagrams of exemplary computer architectures suitable for executing the instruction(s) detailed herein. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Referring now to FIG. 7, shown is a block diagram of a system 700 in accordance with one embodiment of the present invention. The system 700 may include one or more processors 710, 715, which are coupled to graphics memory controller hub (GMCH) 720. The optional nature of additional processor 715 is denoted in FIG. 7 with broken lines.

Each processing processor may be a single core or may, alternatively, include multiple cores. The processing processors may, optionally, include other on-die elements besides processing cores, such as integrated memory controller and/or integrated I/O control logic. Also, for at least one embodiment, the core(s) of the processing elements may be multithreaded in that they may include more than one hardware thread context per core.

FIG. 7 illustrates that the GMCH 720 may be coupled to a memory 740 that may be, for example, a dynamic random access memory (DRAM). The DRAM may, for at least one embodiment, be associated with a non-volatile cache.

The GMCH 720 may be a chipset, or a portion of a chipset. The GMCH 720 may communicate with the processor(s) 710, 715 and control interaction between the processor(s) 710, 715 and memory 740. The GMCH 720 may also act as an accelerated bus interface between the processor(s) 710, 715 and other elements of the system 700. For at least one embodiment, the GMCH 720 communicates with the processor(s) 710, 715 via a multi-drop bus, such as a frontside bus (FSB) 795.

Furthermore, GMCH 720 is coupled to a display 740 (such as a flat panel display). GMCH 720 may include an integrated graphics accelerator. GMCH 720 is further coupled to an input/output (I/O) controller hub (ICH) 750, which may be used to couple various peripheral devices to system 700. Shown for example in the embodiment of FIG. 7 is an external graphics device 760, which may be a discrete graphics device coupled to ICH 750, along with another peripheral device 770.

Alternatively, additional or different processing elements may also be present in the system 700. For example, additional processor 715 may include additional processors(s) that are the same as processor 710, additional processor(s) that are heterogeneous or asymmetric to processor 710, accelerators (such as, e.g., graphics accelerators or digital signal processing (DSP) units), field programmable gate arrays, or any other processing element. There can be a variety of differences between the physical resources 710, 715 in terms of a spectrum of metrics of merit including architectural, microarchitectural, thermal, power consumption characteristics, and the like. These differences may effectively manifest themselves as asymmetry and heterogeneity amongst the processors 710, 715. For at least one embodiment, the various processors 710, 715 may reside in the same die package.

Referring now to FIG. 8, shown is a block diagram of a second system 800 in accordance with an embodiment of the present invention. As shown in FIG. 8, multiprocessor system 800 is a point-to-point interconnect system, and includes a first processing element 870 and a second processing element 880 coupled via a point-to-point interconnect 850. Each of processing elements 870 and 880 may be multicore processors, including first and second processor cores.

Alternatively, one or more of processing elements 870, 880 may be an element other than a processor, such as an accelerator or a field programmable gate array.

While shown with only two processing elements 870, 880, it is to be understood that the scope of the present invention is not so limited. In other embodiments, one or more additional processing elements may be present in a given processor.

First processing element 870 may further include a memory controller hub (MCH) 872 and point-to-point (P-P) interfaces 876 and 878. Similarly, second processing element 880 may include a MCH 882 and P-P interfaces 886 and 888. Processors 870, 880 may exchange data via a point-to-point (PtP) interface 850 using PtP interface circuits 878, 888. As shown in FIG. 8, MCH's 872 and 882 couple the processors to respective memories, namely a memory 842 and a memory 844, which may be portions of main memory locally attached to the respective processors.

Processors 870, 880 may each exchange data with a chipset 890 via individual PtP interfaces 852, 854 using point to point interface circuits 876, 894, 886, 898. Chipset 890 may also exchange data with a high-performance graphics circuit 838 via a high-performance graphics interface 839. Embodiments of the invention may be located within any processor having any number of processing cores, or within each of the PtP bus agents of FIG. 8. In one embodiment, any processor core may include or otherwise be associated with a local cache memory (not shown). Furthermore, a shared cache (not shown) may be included in either processor outside of both processors, yet connected with the processors via p2p interconnect, such that either or both processors' local cache information may be stored in the shared cache if a processor is placed into a low power mode.

First processing element 870 and second processing element 880 may be coupled to a chipset 890 via P-P interconnects 876, 886 and 884, respectively. As shown in FIG. 8, chipset 890 includes P-P interfaces 894 and 898. Furthermore, chipset 890 includes an interface 892 to couple chipset 890 with a high performance graphics engine 848. In one embodiment, bus 849 may be used to couple graphics engine 848 to chipset 890. Alternately, a point-to-point interconnect 849 may couple these components.

In turn, chipset 890 may be coupled to a first bus 816 via an interface 896. In one embodiment, first bus 816 may be a Peripheral Component Interconnect (PCI) bus, or a bus such as a PCI Express bus or another third generation I/O interconnect bus, although the scope of the present invention is not so limited.

As shown in FIG. 8, various I/O devices 814 may be coupled to first bus 816, along with a bus bridge 818 which couples first bus 816 to a second bus 820. In one embodiment, second bus 820 may be a low pin count (LPC) bus. Various devices may be coupled to second bus 820 including, for example, a keyboard/mouse 822, communication devices 826 and a data storage unit 828 such as a disk drive or other mass storage device which may include code 830, in one embodiment. Further, an audio I/O 824 may be coupled to second bus 820. Note that other architectures are possible. For example, instead of the point-to-point architecture of FIG. 8, a system may implement a multi-drop bus or other such architecture.

Referring now to FIG. 9, shown is a block diagram of a second more specific exemplary system 900 in accordance with an embodiment of the present invention. Like elements in FIGS. 8 and 9 bear like reference numerals, and certain aspects of FIG. 8 have been omitted from FIG. 9 in order to avoid obscuring other aspects of FIG. 9.

FIG. 9 illustrates that the processors 870, 880 may include integrated memory and I/O control logic ("CL") 872 and 882, respectively. Thus, the CL 872, 882 include integrated memory controller units and include I/O control logic. FIG. 9 illustrates that not only are the memories 832, 834 coupled to the CL 872, 882, but also that I/O devices 914 are also coupled to the control logic 872, 882. Legacy I/O devices 915 are coupled to the chipset 890.

Figure 10:
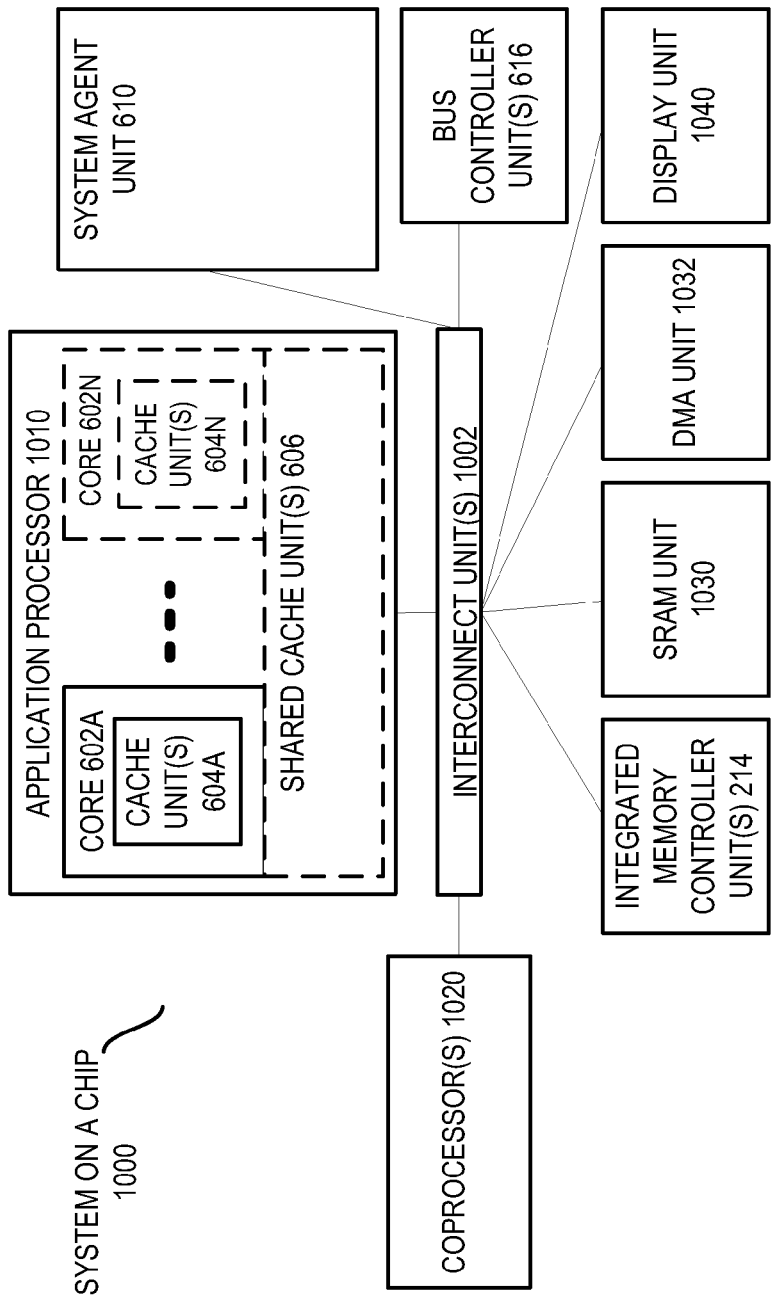
FIG. 10 illustrates a block diagram of a system on a chip (SoC) in accordance with an embodiment of the present invention.

Referring now to FIG. 10, shown is a block diagram of a SoC 1000 in accordance with an embodiment of the present invention. Similar elements in FIG. 2 bear like reference numerals. Also, dashed lined boxes are optional features on more advanced SoCs. In FIG. 10, an interconnect unit(s) 1002 is coupled to: an application processor 1010 which includes a set of one or more cores 602A-N and shared cache unit(s) 606; a system agent unit 610; a bus controller unit(s) 616; an integrated memory controller unit(s) 614; a set or one or more coprocessors 1020 which may include integrated graphics logic, an image processor, an audio processor, and a video processor; an static random access memory (SRAM) unit 1030; a direct memory access (DMA) unit 1032; and a display unit 1040 for coupling to one or more external displays. In one embodiment, the coprocessor(s) 1020 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 830 illustrated in FIG. 8, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 11:
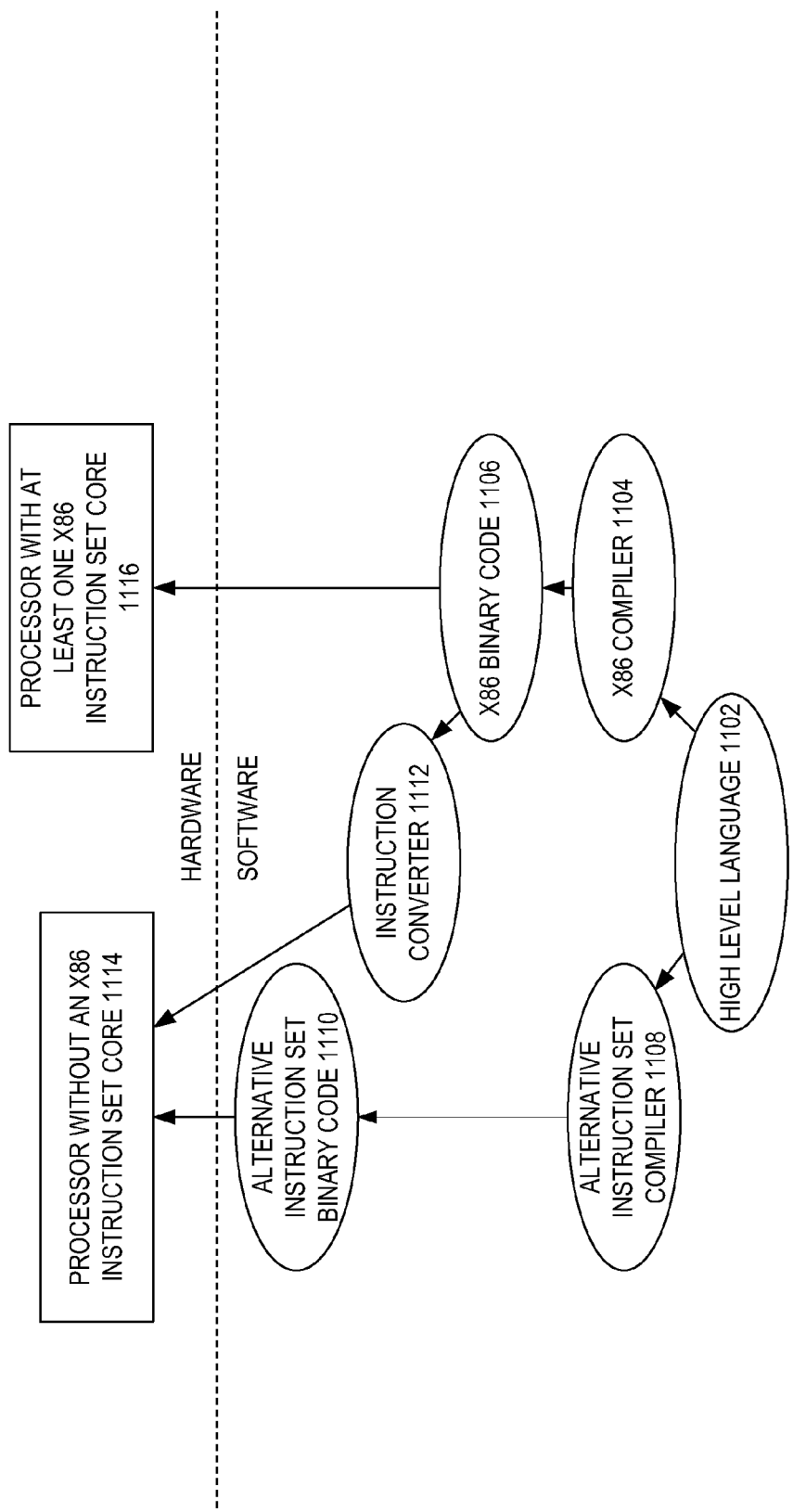
FIG. 11 is a block diagram contrasting the use of a software instruction converter to convert binary instructions in a source instruction set to binary instructions in a target instruction set according to embodiments of the invention.

FIG. 11 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 11 shows a program in a high level language 1102 may be compiled using an x86 compiler 1104 to generate x86 binary code 1106 that may be natively executed by a processor with at least one x86 instruction set core 1116 (it is assumed that some of the instructions that were compiled are in the instruction format for vector operations such as VGATHERNS and VMOVSTRIDENS). The processor with at least one x86 instruction set core 1116 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1104 represents a compiler that is operable to generate x86 binary code 1106 (e.g., object code) that can, with or without additional linkage processing, be executed on the processor with at least one x86 instruction set core 1116.

Similarly, FIG. 11 shows the program in the high level language 1102 may be compiled using an alternative instruction set compiler 1108 to generate alternative instruction set binary code 1110 that may be natively executed by a processor without at least one x86 instruction set core 1114 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1112 is used to convert the x86 binary code 1106 into code that may be natively executed by the processor without an x86 instruction set core 1114. This converted code is not likely to be the same as the alternative instruction set binary code 1110 because an instruction converter capable of this is difficult to make; however, the converted code will accomplish the general operation and be made up of instructions from the alternative instruction set. Thus, the instruction converter 1112 represents software, firmware, hardware, or a combination thereof that, through emulation, simulation or any other process, allows a processor or other electronic device that does not have an x86 instruction set processor or core to execute the x86 binary code 1106.

Figure 12B:
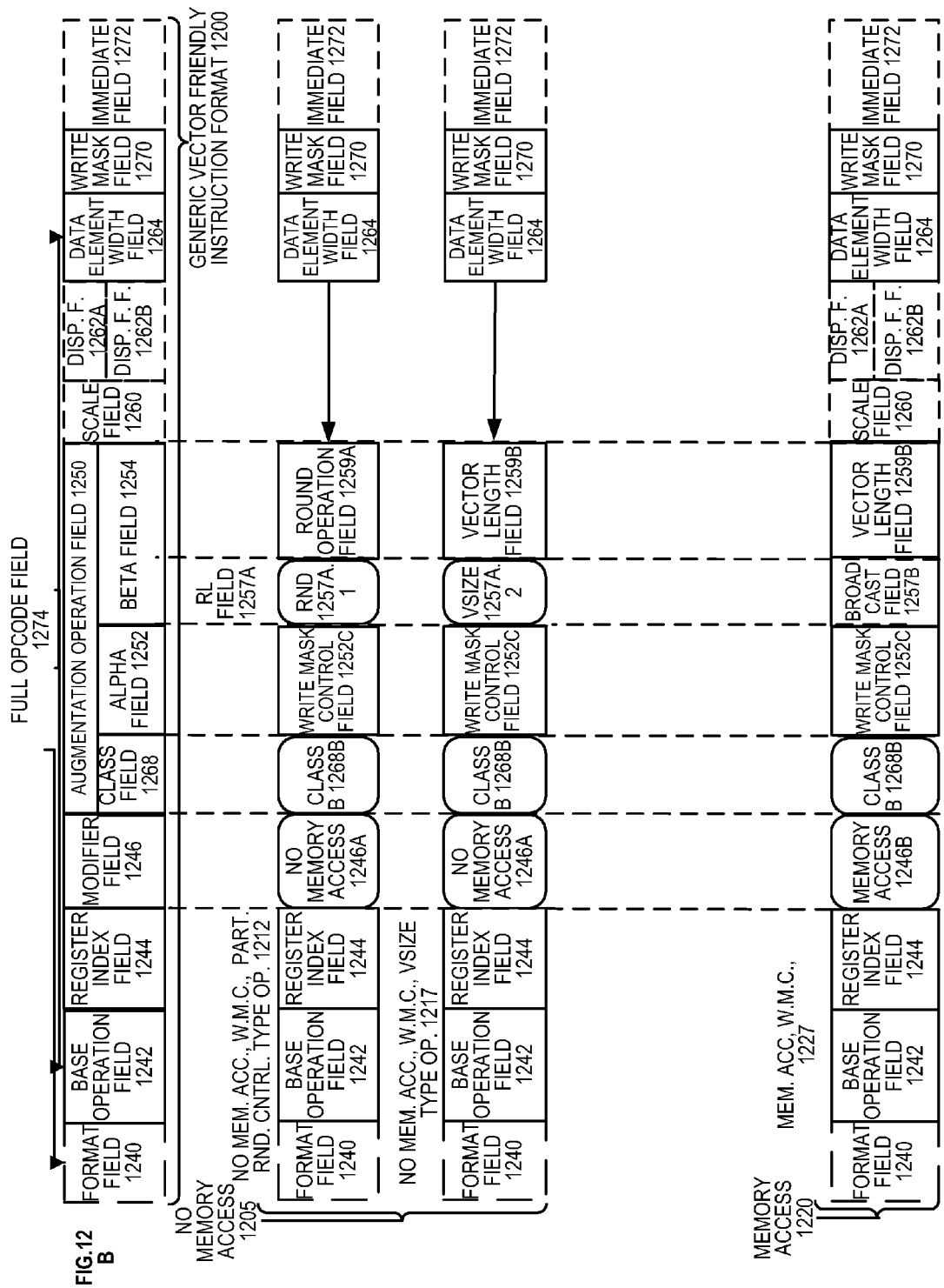

FIGS. 12A-12B are block diagrams illustrating a generic vector friendly instruction format and instruction templates thereof according to embodiments of the invention. FIG. 12A is a block diagram illustrating a generic vector friendly instruction format and class A instruction templates thereof according to embodiments of the invention; while FIG. 12B is a block diagram illustrating the generic vector friendly instruction format and class B instruction templates thereof according to embodiments of the invention. Specifically, a generic vector friendly instruction format 1200 for which are defined class A and class B instruction templates, both of which include no memory access 1205 instruction templates and memory access 1220 instruction templates. The term generic in the context of the vector friendly instruction format refers to the instruction format not being tied to any specific instruction set.

While embodiments of the invention will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 12A include: 1) within the no memory access 1205 instruction templates there is shown a no memory access, full round control type operation 1210 instruction template and a no memory access, data transform type operation 1215 instruction template; and 2) within the memory access 1220 instruction templates there is shown a memory access, temporal 1225 instruction template and a memory access, non-temporal 1230 instruction template. The class B instruction templates in FIG. 12B include: 1) within the no memory access 1205 instruction templates there is shown a no memory access, write mask control, partial round control type operation 1212 instruction template and a no memory access, write mask control, vsize type operation 1217 instruction template; and 2) within the memory access 1220 instruction templates there is shown a memory access, write mask control 1227 instruction template.

The generic vector friendly instruction format 1200 includes the following fields listed below in the order illustrated in FIGS. 12A-12B.

Format field 1240—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 1242—its content distinguishes different base operations.

Register index field 1244—its content, directly or through address generation, specifies the locations of the source and destination operands, be they in registers or in memory. These include a sufficient number of bits to select N registers from a P×Q (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 1246—its content distinguishes occurrences of instructions in the generic vector instruction format that specify memory access from those that do not; that is, between no memory access 1205 instruction templates and memory access 1220 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 1250—its content distinguishes which one of a variety of different operations to be performed in addition to the base operation. This field is context specific. In one embodiment of the invention, this field is divided into a class field 1268, an alpha field 1252, and a beta field 1254. The augmentation operation field 1250 allows common groups of operations to be performed in a single instruction rather than 2, 3, or 4 instructions.

Scale field 1260—its content allows for the scaling of the index field's content for memory address generation (e.g., for address generation that uses $2^{scale}*\text{index}+\text{base}$).

Displacement Field 1262A—its content is used as part of memory address generation (e.g., for address generation that uses $2^{scale}*\text{index}+\text{base}+\text{displacement}$).

Displacement Factor Field 1262B (note that the juxtaposition of displacement field 1262A directly over displacement factor field 1262B indicates one or the other is used)—its content is used as part of address generation; it specifies a displacement factor that is to be scaled by the size of a memory access (N)—where N is the number of bytes in the memory access (e.g., for address generation that uses $2^{scale}*\text{index}+\text{base}+\text{scaled displacement}$). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 1274 (described herein) and the data manipulation field 1254C. The displacement field 1262A and the displacement factor field 1262B are optional in the sense that they are not used for the no memory access 1205 instruction templates and/or different embodiments may implement only one or none of the two.

Data element width field 1264—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 1270—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 1270 allows for partial vector operations, including loads, stores, arithmetic, logical, etc. While embodiments of the invention are described in which the write mask field's 1270 content selects one of a number of write mask registers that contains the write mask to be used (and thus the write mask field's 1270 content indirectly identifies that masking to be performed), alternative embodiments instead or additional allow the mask write field's 1270 content to directly specify the masking to be performed.

Immediate field 1272—its content allows for the specification of an immediate. This field is optional in the sense that is it not present in an implementation of the generic vector friendly format that does not support immediate and it is not present in instructions that do not use an immediate.

Class field 1268—its content distinguishes between different classes of instructions. With reference to FIGS. 12A-B, the contents of this field select between class A and class B instructions. In FIGS. 12A-B, rounded corner squares are used to indicate a specific value is present in a field (e.g., class A 1268A and class B 1268B for the class field 1268 respectively in FIGS. 12A-B).

Instruction Templates of Class A

In the case of the non-memory access 1205 instruction templates of class A, the alpha field 1252 is interpreted as an RS field 1252A, whose content distinguishes which one of the different augmentation operation types are to be performed (e.g., round 1252A.1 and data transform 1252A.2 are respectively specified for the no memory access, round type operation 1210 and the no memory access, data transform type operation 1215 instruction templates), while the beta field 1254 distinguishes which of the operations of the specified type is to be performed. In the no memory access 1205 instruction templates, the scale field 1260, the displacement field 1262A, and the displacement scale filed 1262B are not present.

No-Memory Access Instruction Templates—Full Round Control Type Operation

In the no memory access full round control type operation 1210 instruction template, the beta field 1254 is interpreted as a round control field 1254A, whose content(s) provide static rounding. While in the described embodiments of the invention the round control field 1254A includes a suppress all floating point exceptions (SAE) field 1256 and a round operation control field 1258, alternative embodiments may support may encode both these concepts into the same field or only have one or the other of these concepts/fields (e.g., may have only the round operation control field 1258).

SAE field 1256—its content distinguishes whether or not to disable the exception event reporting; when the SAE field's 1256 content indicates suppression is enabled, a given instruction does not report any kind of floating-point exception flag and does not raise any floating point exception handler.

Round operation control field 1258—its content distinguishes which one of a group of rounding operations to perform (e.g., Round-up, Round-down, Round-towards-zero and Round-to-nearest). Thus, the round operation control field 1258 allows for the changing of the rounding mode on a per instruction basis. In one embodiment of the invention where a processor includes a control register for specifying rounding modes, the round operation control field's 1250 content overrides that register value.

No Memory Access Instruction Templates—Data Transform Type Operation

In the no memory access data transform type operation 1215 instruction template, the beta field 1254 is interpreted as a data transform field 12546, whose content distinguishes which one of a number of data transforms is to be performed (e.g., no data transform, swizzle, broadcast).

In the case of a memory access 1220 instruction template of class A, the alpha field 1252 is interpreted as an eviction hint field 1252B, whose content distinguishes which one of the eviction hints is to be used (in FIG. 12A, temporal 1252B.1 and non-temporal 1252B.2 are respectively specified for the memory access, temporal 1225 instruction template and the memory access, non-temporal 1230 instruction template), while the beta field 1254 is interpreted as a data manipulation field 1254C, whose content distinguishes which one of a number of data manipulation operations (also known as primitives) is to be performed (e.g., no manipulation; broadcast; up conversion of a source; and down conversion of a destination). The memory access 1220 instruction templates include the scale field 1260, and optionally the displacement field 1262A or the displacement scale field 1262B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 1252 is interpreted as a write mask control (Z) field 1252C, whose content distinguishes whether the write masking controlled by the write mask field 1270 should be a merging or a zeroing.

In the case of the non-memory access 1205 instruction templates of class B, part of the beta field 1254 is interpreted as an RL field 1257A, whose content distinguishes which one of the different augmentation operation types are to be performed (e.g., round 1257A.1 and vector length (VSIZE) 1257A.2 are respectively specified for the no memory access, write mask control, partial round control type operation 1212 instruction template and the no memory access, write mask control, VSIZE type operation 1217 instruction template), while the rest of the beta field 1254 distinguishes which of the operations of the specified type is to be performed. In the no memory access 1205 instruction templates, the scale field 1260, the displacement field 1262A, and the displacement scale filed 1262B are not present.

In the no memory access, write mask control, partial round control type operation 1210 instruction template, the rest of the beta field 1254 is interpreted as a round operation field 1259A and exception event reporting is disabled (a given instruction does not report any kind of floating-point exception flag and does not raise any floating point exception handler).

Round operation control field 1259A—just as round operation control field 1258, its content distinguishes which one of a group of rounding operations to perform (e.g., Round-up, Round-down, Round-towards-zero and Round-to-nearest). Thus, the round operation control field 1259A allows for the changing of the rounding mode on a per instruction basis. In one embodiment of the invention where a processor includes a control register for specifying rounding modes, the round operation control field's 1250 content overrides that register value.

In the no memory access, write mask control, VSIZE type operation 1217 instruction template, the rest of the beta field 1254 is interpreted as a vector length field 1259B, whose content distinguishes which one of a number of data vector lengths is to be performed on (e.g., 128, 256, or 512 byte).

In the case of a memory access 1220 instruction template of class B, part of the beta field 1254 is interpreted as a broadcast field 1257B, whose content distinguishes whether or not the broadcast type data manipulation operation is to be performed, while the rest of the beta field 1254 is interpreted the vector length field 1259B. The memory access 1220 instruction templates include the scale field 1260, and optionally the displacement field 1262A or the displacement scale field 1262B.

With regard to the generic vector friendly instruction format 1200, a full opcode field 1274 is shown including the format field 1240, the base operation field 1242, and the data element width field 1264. While one embodiment is shown where the full opcode field 1274 includes all of these fields, the full opcode field 1274 includes less than all of these fields in embodiments that do not support all of them. The full opcode field 1274 provides the operation code (opcode).

The augmentation operation field 1250, the data element width field 1264, and the write mask field 1270 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the invention, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the invention). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments of the invention. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

FIGS. 13A-D are block diagrams illustrating an exemplary specific vector friendly instruction format according to embodiments of the invention. FIG. 13 shows a specific vector friendly instruction format 1300 that is specific in the sense that it specifies the location, size, interpretation, and order of the fields, as well as values for some of those fields. The specific vector friendly instruction format 1300 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIG. 12 into which the fields from FIG. 13 map are illustrated.

It should be understood that, although embodiments of the invention are described with reference to the specific vector friendly instruction format 1300 in the context of the generic vector friendly instruction format 1200 for illustrative purposes, the invention is not limited to the specific vector friendly instruction format 1300 except where claimed. For example, the generic vector friendly instruction format 1200 contemplates a variety of possible sizes for the various fields, while the specific vector friendly instruction format 1300 is shown as having fields of specific sizes. By way of specific example, while the data element width field 1264 is illustrated as a one bit field in the specific vector friendly instruction format 1300, the invention is not so limited (that is, the generic vector friendly instruction format 1200 contemplates other sizes of the data element width field 1264).

The generic vector friendly instruction format 1200 includes the following fields listed below in the order illustrated in FIG. 13A.

EVEX Prefix (Bytes 0-3) 1302—is encoded in a four-byte form.

Format Field 1240 (EVEX Byte 0, bits [7:0])—the first byte (EVEX Byte 0) is the format field 1240 and it contains 0x62 (the unique value used for distinguishing the vector friendly instruction format in one embodiment of the invention).

The second-fourth bytes (EVEX Bytes 1-3) include a number of bit fields providing specific capability.

REX field 1305 (EVEX Byte 1, bits [7-5])—consists of a EVEX.R bit field (EVEX Byte 1, bit [7]-R), EVEX.X bit field (EVEX byte 1, bit [6]-X), and 1257BEX byte 1, bit[5]-B). The EVEX.R, EVEX.X, and EVEX.B bit fields provide the same functionality as the corresponding VEX bit fields, and are encoded using 1s complement form, i.e. ZMM0 is encoded as 1211B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 1210—this is the first part of the REX' field 1210 and is the EVEX.R' bit field (EVEX Byte 1, bit [4]-R') that is used to encode either the upper 16 or lower 16 of the extended 32 register set. In one embodiment of the invention, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative embodiments of the invention do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 1315 (EVEX byte 1, bits [3:0]-mmmm)—its content encodes an implied leading opcode byte (0F, 0F 38, or 0F 3).

Data element width field 1264 (EVEX byte 2, bit [7]-W)—is represented by the notation EVEX.W. EVEX.W is used to define the granularity (size) of the datatype (either 32-bit data elements or 64-bit data elements).

EVEX.vvvv 1320 (EVEX Byte 2, bits [6:3]-vvvv)—the role of EVEX.vvvv may include the following: 1) EVEX.vvvv encodes the first source register operand, specified in inverted (1 s complement) form and is valid for instructions with 2 or more source operands; 2) EVEX.vvvv encodes the destination register operand, specified in 1s complement form for certain vector shifts; or 3) EVEX.vvvv does not encode any operand, the field is reserved and should contain 1111 b. Thus, EVEX.vvvv field 1320 encodes the 4 low-order bits of the first source register specifier stored in inverted (1s complement) form. Depending on the instruction, an extra different EVEX bit field is used to extend the specifier size to 32 registers.

EVEX.U 1268 Class field (EVEX byte 2, bit [2]-U)—If EVEX.U=0, it indicates class A or EVEX.U0; if EVEX.U=1, it indicates class B or EVEX.U1.

Prefix encoding field 1325 (EVEX byte 2, bits [1:0]-pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 1252 (EVEX byte 3, bit [7]-EH; also known as EVEX.EH, EVEX.rs, EVEX.RL, EVEX.write mask control, and EVEX.N; also illustrated with α)—as previously described, this field is context specific.

Beta field 1254 (EVEX byte 3, bits [6:4]-SSS, also known as $EVEX.s_{2-0}$, $EVEX.r_{2-0}$, EVEX.rr1, EVEX.LL0, EVEX.LLB; also illustrated with βββ)—as previously described, this field is context specific.

REX' field 1210—this is the remainder of the REX' field and is the EVEX.V' bit field (EVEX Byte 3, bit [3]-V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 1270 (EVEX byte 3, bits [2:0]-kkk)—its content specifies the index of a register in the write mask registers as previously described. In one embodiment of the invention, the specific value EVEX.kkk=000 has a special behavior implying no write mask is used for the particular instruction (this may be implemented in a variety of ways including the use of a write mask hardwired to all ones or hardware that bypasses the masking hardware).

Real Opcode Field 1330 (Byte 4) is also known as the opcode byte. Part of the opcode is specified in this field.

MOD R/M Field 1340 (Byte 5) includes MOD field 1342, Reg field 1344, and R/M field 1346. As previously described, the MOD field's 1342 content distinguishes between memory access and non-memory access operations. The role of Reg field 1344 can be summarized to two situations: encoding either the destination register operand or a source register operand, or be treated as an opcode extension and not used to encode any instruction operand. The role of R/M field 1346 may include the following: encoding the instruction operand that references a memory address, or encoding either the destination register operand or a source register operand.

Scale, Index, Base (SIB) Byte (Byte 6)—As previously described, the scale field's 1250 content is used for memory address generation. SIB.xxx 1354 and SIB.bbb 1356—the contents of these fields have been previously referred to with regard to the register indexes Xxxx and Bbbb.

Displacement field 1262A (Bytes 7-10)—when MOD field 1342 contains 10, bytes 7-10 are the displacement field 1262A, and it works the same as the legacy 32-bit displacement (disp32) and works at byte granularity.

Displacement factor field 1262B (Byte 7)—when MOD field 1342 contains 01, byte 7 is the displacement factor field 1262B. The location of this field is that same as that of the legacy x86 instruction set 8-bit displacement (disp8), which works at byte granularity. Since disp8 is sign extended, it can only address between −128 and 127 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 1262B is a reinterpretation of disp8; when using displacement factor field 1262B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 1262B substitutes the legacy x86 instruction set 8-bit displacement. Thus, the displacement factor field 1262B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset).

Immediate field 1272 operates as previously described.

Full Opcode Field

FIG. 13B is a block diagram illustrating the fields of the specific vector friendly instruction format 1300 that make up the full opcode field 1274 according to one embodiment of the invention. Specifically, the full opcode field 1274 includes the format field 1240, the base operation field 1242, and the data element width (W) field 1264. The base operation field 1242 includes the prefix encoding field 1325, the opcode map field 1315, and the real opcode field 1330.

Register Index Field

FIG. 13C is a block diagram illustrating the fields of the specific vector friendly instruction format 1300 that make up the register index field 1244 according to one embodiment of the invention. Specifically, the register index field 1244 includes the REX field 1305, the REX' field 1310, the MODR/M.reg field 1344, the MODR/M.r/m field 1346, the VVVV field 1320, xxx field 1354, and the bbb field 1356.

Augmentation Operation Field

Figure 13D:
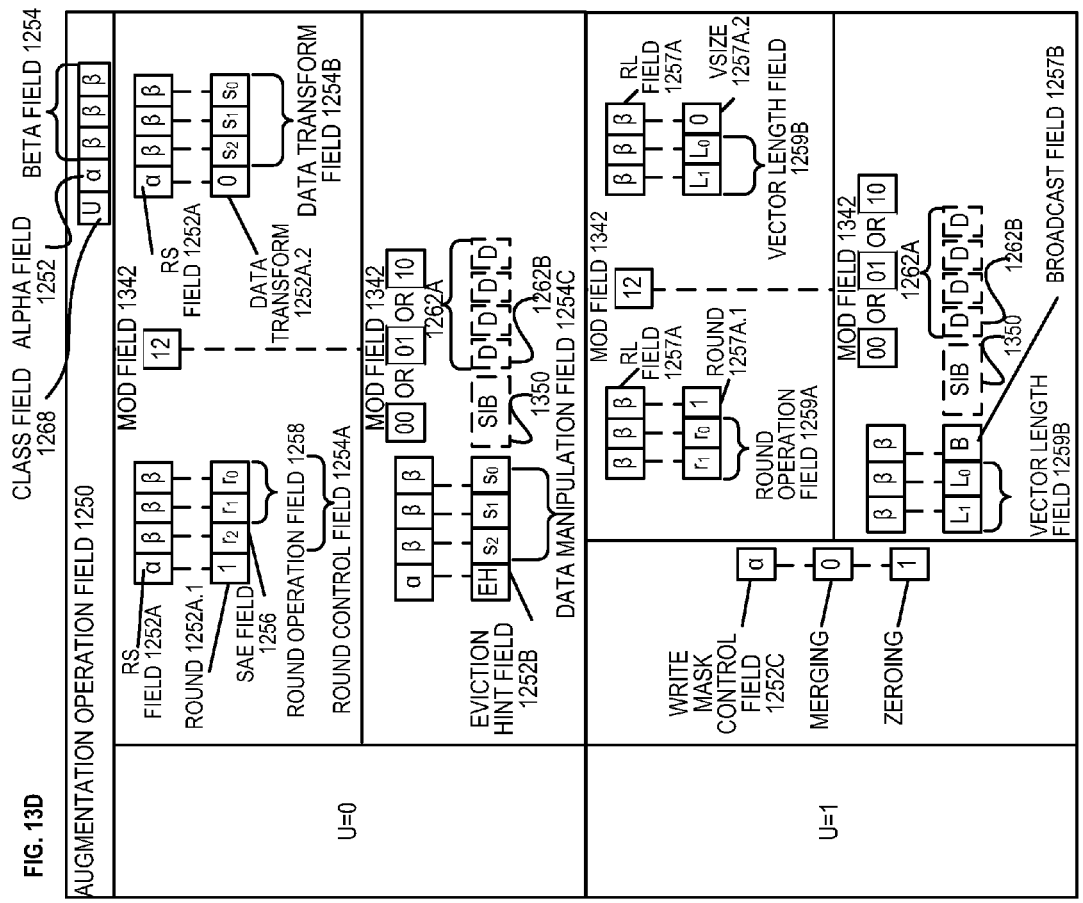

FIG. 13D is a block diagram illustrating the fields of the specific vector friendly instruction format 1300 that make up the augmentation operation field 1250 according to one embodiment of the invention. When the class (U) field 1268 contains 0, it signifies EVEX.U0 (class A 1268A); when it contains 1, it signifies EVEX.U1 (class B 1268B). When U=0 and the MOD field 1342 contains 11 (signifying a no memory access operation), the alpha field 1252 (EVEX byte 3, bit [7]-EH) is interpreted as the rs field 1252A. When the rs field 1252A contains a 1 (round 1252A.1), the beta field 1254 (EVEX byte 3, bits [6:4]-SSS) is interpreted as the round control field 1254A. The round control field 1254A includes a one bit SAE field 1256 and a two bit round operation field 1258. When the rs field 1252A contains a 0 (data transform 1252A.2), the beta field 1254 (EVEX byte 3, bits [6:4]-SSS) is interpreted as a three bit data transform field 1254B. When U=0 and the MOD field 1342 contains 00, 01, or 10 (signifying a memory access operation), the alpha field 1252 (EVEX byte 3, bit [7]-EH) is interpreted as the eviction hint (EH) field 1252B and the beta field 1254 (EVEX byte 3, bits [6:4]-SSS) is interpreted as a three bit data manipulation field 1254C.

When U=1, the alpha field 1252 (EVEX byte 3, bit [7]-EH) is interpreted as the write mask control (Z) field 1252C. When U=1 and the MOD field 1342 contains 11 (signifying a no memory access operation), part of the beta field 1254 (EVEX byte 3, bit [4]-$S_0$) is interpreted as the RL field 1257A; when it contains a 1 (round 1257A.1) the rest of the beta field 1254 (EVEX byte 3, bit [6-5]-$S_{2-1}$) is interpreted as the round operation field 1259A, while when the RL field 1257A contains a 0 (VSIZE 1257.A2) the rest of the beta field 1254 (EVEX byte 3, bit [6-5]-$S_{2-1}$) is interpreted as the vector length field 1259B (EVEX byte 3, bit [6-5]-$L_{1-0}$). When U=1 and the MOD field 1342 contains 00, 01, or 10 (signifying a memory access operation), the beta field 1254 (EVEX byte 3, bits [6:4]-SSS) is interpreted as the vector length field 1259B (EVEX byte 3, bit [6-5]-$L_{1-0}$) and the broadcast field 1257B (EVEX byte 3, bit [4]-B).

FIG. 14 is a block diagram of a register architecture 1400 according to one embodiment of the invention. In the embodiment illustrated, there are 32 vector registers 1410 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 1300 operates on these overlaid register file as illustrated in the below tables.

| Adjustable Vector Length | Class | Operations | Registers |
|---|---|---|---|
| Instruction Templates that do not include the vector length field 1259B | A (FIG. 12A; U = 0) | 1210, 1215, 1225, 1230 | zmm registers (the vector length is 64 byte) |
| | B (FIG. 12B; U = 1) | 1212 | zmm registers (the vector length is 64 byte) |
| Instruction Templates that do include the vector length field 1259B | B (FIG. 12B; U = 1) | 1217, 1227 | zmm, ymm, or xmm registers (the vector length is 64 byte, 32 byte, or 16 byte) depending on the vector length field 1259B |

In other words, the vector length field 1259B selects between a maximum length and one or more other shorter lengths, where each such shorter length is half the length of the preceding length; and instructions templates without the vector length field 1259B operate on the maximum vector length. Further, in one embodiment, the class B instruction templates of the specific vector friendly instruction format 1300 operate on packed or scalar single/double-precision floating point data and packed or scalar integer data. Scalar operations are operations performed on the lowest order data element position in an zmm/ymm/xmm register; the higher order data element positions are either left the same as they were prior to the instruction or zeroed depending on the embodiment.

Write mask registers 1415—in the embodiment illustrated, there are 8 write mask registers (k0 through k7), each 64 bits in size. In an alternate embodiment, the write mask registers 1415 are 16 bits in size. As previously described, in one embodiment of the invention, the vector mask register k0 cannot be used as a write mask; when the encoding that would normally indicate k0 is used for a write mask, it selects a hardwired write mask of 0xFFFF, effectively disabling write masking for that instruction.

General-purpose registers 1425—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 1445, on which is aliased the MMX packed integer flat register file 1450—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the invention may use wider or narrower registers. Additionally, alternative embodiments of the invention may use more, less, or different register files and registers.

FIGS. 15A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 15A is a block diagram of a single processor core, along with its connection to the on-die interconnect network 1502 and with its local subset of the Level 2 (L2) cache 1504, according to embodiments of the invention. In one embodiment, an instruction decoder 1500 supports the x86 instruction set with a packed data instruction set extension. An L1 cache 1506 allows low-latency accesses to cache memory into the scalar and vector units. While in one embodiment (to simplify the design), a scalar unit 1508 and a vector unit 1510 use separate register sets (respectively, scalar registers 1512 and vector registers 1514) and data transferred between them is written to memory and then read back in from a level 1 (L1) cache 1506, alternative embodiments of the invention may use a different approach (e.g., use a single register set or include a communication path that allow data to be transferred between the two register files without being written and read back).

The local subset of the L2 cache 1504 is part of a global L2 cache that is divided into separate local subsets, one per processor core. Each processor core has a direct access path to its own local subset of the L2 cache 1504. Data read by a processor core is stored in its L2 cache subset 1504 and can be accessed quickly, in parallel with other processor cores accessing their own local L2 cache subsets. Data written by a processor core is stored in its own L2 cache subset 1504 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 15B is an expanded view of part of the processor core in FIG. 15A according to embodiments of the invention. FIG. 15B includes an L1 data cache 1506A part of the L1 cache 1504, as well as more detail regarding the vector unit 1510 and the vector registers 1514. Specifically, the vector unit 1510 is a 16-wide vector processing unit (VPU) (see the 16-wide ALU 1528), which executes one or more of integer, single-precision float, and double-precision float instructions. The VPU supports swizzling the register inputs with swizzle unit 1520, numeric conversion with numeric convert units 1522A-B, and replication with replication unit 1524 on the memory input. Write mask registers 1526 allow predicating resulting vector writes.

Embodiments of the invention may include various steps, which have been described above. The steps may be embodied in machine-executable instructions which may be used to cause a general-purpose or special-purpose processor to perform the steps. Alternatively, these steps may be performed by specific hardware components that contain hardwired logic for performing the steps, or by any combination of programmed computer components and custom hardware components.

Elements of the present invention may also be provided as a computer program product which may include a machine-readable medium having stored thereon instructions which may be used to program a computer (or other electronic device) to perform a process. The machine-readable medium may include, but is not limited to, floppy diskettes, optical disks, CD-ROMs, and magneto-optical disks, ROMs, RAMs, EPROMs, EEPROMs, magnet or optical cards, propagation media or other type of media/machine-readable medium suitable for storing electronic instructions. For example, the present invention may be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection).

Exemplary embodiments include a processor that loads data element, comprising an upper level cache and at least one processor core coupled to the upper level cache, including one or more registers and a plurality of instruction processing stages. The stages includes a decoder unit to decode an instruction requiring an input of a plurality of data elements, wherein a size of each of the plurality of data elements is less than a cache line size of the processor and an execution unit to load the plurality of data elements to the one or more registers, without loading data elements spatially adjacent to the plurality of data elements or the plurality of data elements in the upper level cache.

In some embodiments, the loading of the plurality of data element is to gather the plurality of data elements in a temporary buffer and load the plurality of data elements from the temporary buffer to the one or more registers.

In some embodiments, the loading of the plurality of data element is to gather the plurality of data elements in a lower level cache of the processor and load the plurality of data elements from the lower level cache to the one or more registers.

In some embodiments, the instruction is specifically for execution of data elements without considering spatial locality. In those embodiments, the instruction may specify a stride value between data elements of the plurality of data elements. The stride value may be bigger than a cache line size of the processor. In those embodiments, the instruction may specify an index corresponding to locations of each of the plurality of data elements.

Exemplary embodiments include a method for loading data elements in a processor. The method includes decoding an instruction, wherein the instruction requires an input of a plurality of data elements, wherein a size of each of the plurality of data elements is less than a cache line size of the processor. The method further includes after decoding the instruction, loading the plurality of data elements to one or more registers of the processor for execution, without loading data elements spatially adjacent to the plurality of data elements or the plurality of data elements in an upper level cache of the processor.

In some embodiments, loading the plurality of data elements to the one or more registers includes gathering the plurality of data elements in a temporary buffer and loading the plurality of data elements from the temporary buffer to the one or more registers.

In some embodiments, loading the plurality of data elements to the one or more registers includes gathering the plurality of data elements in a lower level cache of the processor and loading the plurality of data elements from the lower level cache to the one or more registers.

In some embodiments, the instruction is specifically for execution of data elements without considering spatial locality. In those embodiments, the instruction may specify a stride value between data elements of the plurality of data elements. The stride value may be bigger than a cache line size of the processor. In those embodiment, the instruction may specify an index corresponding to locations of each of the plurality of data elements.

Exemplary embodiments include a computer system that loads data elements. The computer system includes a memory for storing instructions and a processor. The processor includes an upper level cache and at least one processor core coupled to the upper level cache, including one or more registers and a plurality of instruction processing stages. The plurality of instruction processing stages includes a decoder unit to decode an instruction, wherein the instruction requires an input of a plurality of data elements, wherein a size of each of the plurality of data elements is less than a cache line size of the processor and an execution unit configured to load the plurality of data elements to the one or more registers, without loading data elements spatially adjacent to the plurality of data elements or the plurality of data elements in an upper level cache of the processor core.

In some embodiments, the loading of the plurality of data element is to gather the plurality of data elements in a temporary buffer and load the plurality of data elements from the lower level cache to the one or more registers.

Throughout this detailed description, for the purposes of explanation, numerous specific details were set forth in order to provide a thorough understanding of the present invention. It will be apparent, however, to one skilled in the art that the invention may be practiced without some of these specific details. In certain instances, well known structures and functions were not described in elaborate detail in order to avoid obscuring the subject matter of the present invention. Accordingly, the scope and spirit of the invention should be judged in terms of the claims which follow.

What is claimed is:

1. A processor that loads data elements, comprising:
   an upper level cache; and
   at least one processor core coupled to the upper level cache, including one or more registers and a plurality of instruction processing stages:
   a decoder unit to decode an instruction requiring an input of a plurality of data elements, wherein a size of each of the plurality of data elements is less than a cache line size of the processor, and
   responsive to the instruction, an execution unit to load the plurality of data elements to the one or more registers, without loading data elements spatially adjacent to the plurality of data elements, wherein the loading of the plurality of data elements is to:
   gather the plurality of data elements in a temporary buffer; and
   load the plurality of data elements from the temporary buffer to the one or more registers.

2. The processor of claim 1, wherein the instruction is specifically for execution of data elements without considering spatial locality.

3. The processor of claim 2, wherein the instruction specifies a stride value between data elements of the plurality of data elements.

4. The processor of claim 3, the stride value is bigger than a cache line size of the processor.

5. The processor of claim 2, wherein the instruction specifies an index corresponding to locations of each of the plurality of data elements.

6. A method for loading data elements in a processor, comprising:
   decoding an instruction, wherein the instruction requires an input of a plurality of data elements, wherein a size of each of the plurality of data elements is less than a cache line size of the processor; and
   after decoding the instruction, responsive to the instruction, loading the plurality of data elements to one or more registers of the processor for execution, without loading data elements spatially adjacent to the plurality of data elements, wherein the loading of the plurality of data elements comprises:
   gathering the plurality of data elements in a temporary buffer; and
   loading the plurality of data elements from the temporary buffer to the one or more registers.

7. The method of claim 6, wherein the instruction is specifically for execution of data elements without considering spatial locality.

8. The method of claim 7, wherein the instruction specifies a stride value between data elements of the plurality of data elements.

9. The method of claim 8, wherein the stride value is bigger than a cache line size of the processor.

10. The method of claim 7, wherein the instruction specifies an index corresponding to locations of each of the plurality of data elements.

11. A computer system that loads data elements, comprising:
    a memory for storing instructions; and
    a processor including:
    an upper level cache;
    at least one processor core coupled to the upper level cache, including one or more registers and a plurality of instruction processing stages:
    a decoder unit to decode an instruction, wherein the instruction requires an input of a plurality of data elements, wherein a size of each of the plurality of data elements is less than a cache line size of the processor, and
    responsive to the instruction, an execution unit configured to load the plurality of data elements to the one or more registers, without loading data elements spatially adjacent to the plurality of data elements, wherein the loading of the plurality of data elements is to:
    gather the plurality of data elements in a temporary buffer; and
    load the plurality of data elements from the temporary buffer to the one or more registers.

12. The computer system of claim 11, wherein the instruction is specifically for execution of data elements without considering spatial locality.

13. The computer system of claim 12, wherein the instruction specifies a stride value between data elements of the plurality of data elements.

14. The computer system of claim 13, the stride value is bigger than a cache line size of the computer system.

* * * * *